(12) United States Patent
Burdeniuc et al.

(10) Patent No.: US 8,143,321 B2
(45) Date of Patent: Mar. 27, 2012

(54) N,N,N,'-TRIMETHYL-BIS-(AMINOETHYL) ETHER AND ITS DERIVATIVES AS CATALYSTS FOR POLYURETHANES

(75) Inventors: Juan Jesus Burdeniuc, Colmar, PA (US); Stephan Herman Wendel, Oldenburg (DE); John William Mitchell, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 754 days.

(21) Appl. No.: 11/485,724

(22) Filed: Jul. 13, 2006

(65) Prior Publication Data

US 2008/0015273 A1 Jan. 17, 2008

(51) Int. Cl.
*C08G 18/18* (2006.01)
*C08G 18/28* (2006.01)
*C08J 9/06* (2006.01)
*C08J 9/12* (2006.01)
*C08J 9/14* (2006.01)

(52) U.S. Cl. ........ 521/115; 521/116; 521/118; 521/129; 521/137; 521/160; 521/163; 521/167; 521/172; 521/174; 525/123; 525/455; 528/49; 528/53; 528/67; 528/76; 528/80

(58) Field of Classification Search .................. 521/129, 521/137, 160, 163, 167, 172, 174, 116, 117, 521/130, 115, 118; 525/123, 455; 528/49, 528/53, 67, 76, 80
See application file for complete search history.

(56) References Cited

U.S. PATENT DOCUMENTS

| 3,330,782 | A * | 7/1967 | Poppelsdorf .................. 521/115 |
| 4,026,840 | A | 5/1977 | Bechara et al. |
| 4,338,408 | A | 7/1982 | Zimmerman et al. |
| 4,433,170 | A | 2/1984 | Zimmerman et al. |
| 4,464,488 | A | 8/1984 | Zimmerman et al. |
| 5,229,430 | A | 7/1993 | Tamano et al. |
| 5,508,314 | A | 4/1996 | Listemann et al. |
| 5,559,161 | A | 9/1996 | Klotz et al. |
| 5,633,293 | A | 5/1997 | Carr et al. |
| 6,387,972 | B1 | 5/2002 | Ghobary et al. |
| 7,009,081 | B2 | 3/2006 | Mitchell et al. |
| 2005/0033091 | A1 * | 2/2005 | Mitchell et al. ................ 564/479 |

FOREIGN PATENT DOCUMENTS

| EP | 0057884 | 8/1982 |
| EP | 0 816 408 A | 1/1998 |
| EP | 0 816 408 A1 | 1/1998 |
| EP | 1505059 | 2/2005 |
| JP | 59134754 | 8/1984 |
| JP | 2005-053913 A | 3/2005 |
| KR | 98-9302 | 4/1998 |

OTHER PUBLICATIONS

Woods, George, "The ICI Polyurethanes Book" John Wiley & Son; ISBN 047192658 2; 2nd edition; 1990; pp. 7-9.
Oertel, Dr. Guenter, "Polyurethane Handbook": Muenchen: Carl Hanser Verlad, ISBN: 0-02-948920; 1985.
Ashida, Kaneyoshi; "Polyurethane and Related Foams" CRC Press, Taylor & Francis Group; ISBN: 1-58716-159-1;p. 47-48, (2007).
Woods, George, "The ICI Polyurethanes Book" John Wiley & Sons, 2nd Edition; ISBN: 047192658 2; 1990; p. 41-54.
Woods, George, "The ICI Polyurethanes Book" John Wiley & Sons, 2nd Edition; ISBN: 0471926582; 1990; p. 10-12.
Randall, David et al; The Polyurethanes Book; John Wiley * Sons, ISBN 0470850418; 2002; p. 131-135.
Huntsman Product Sheet Chemical Products Jeffcat Cataysts, (Dec. 2000).
Huntsman; Technical Bulletin Jeffcat ZF-20 Catalyst; 1995.
Randall, David et al; The Polyurethanes Book; John Wiley & Sons ISBN: 0470850418; 2002; chapter 2; p. 151-168.
Randall, David, et al; "The Polyurethanes Book" John Wiley & Sons; ISBN: 0470850418; 2002; p. 195,197,206, 208, 209, 219, 221, 228, 251, 160, 269, 274, 304, 307, 335.
Kaushiva, Bryan, Structure-Property Relationships of Flexible Polyurethane Foams; (1999).
Huntsman; Sales Documents Jeffcat, (Nov. 15, 2005).
Magyar Tudomanyos Akademia analysis ZF029, (Oct. 20, 2010).
Analysis of Batch PF2050193 of Jeffcat ZF-20, (Oct. 20, 2010).

* cited by examiner

*Primary Examiner* — Rabon Sergent
(74) *Attorney, Agent, or Firm* — Michael K. Boyer

(57) ABSTRACT

The present invention provides compounds produced by the reaction of glycidyl ethers and glycidyl esters with ether compounds including N,N,N'-trimethyl-bis-(aminoethyl) ether. N,N,N'-trimethyl-bis-(aminoethyl) ether and its derivatives can be used as polyurethane catalysts.

9 Claims, 3 Drawing Sheets

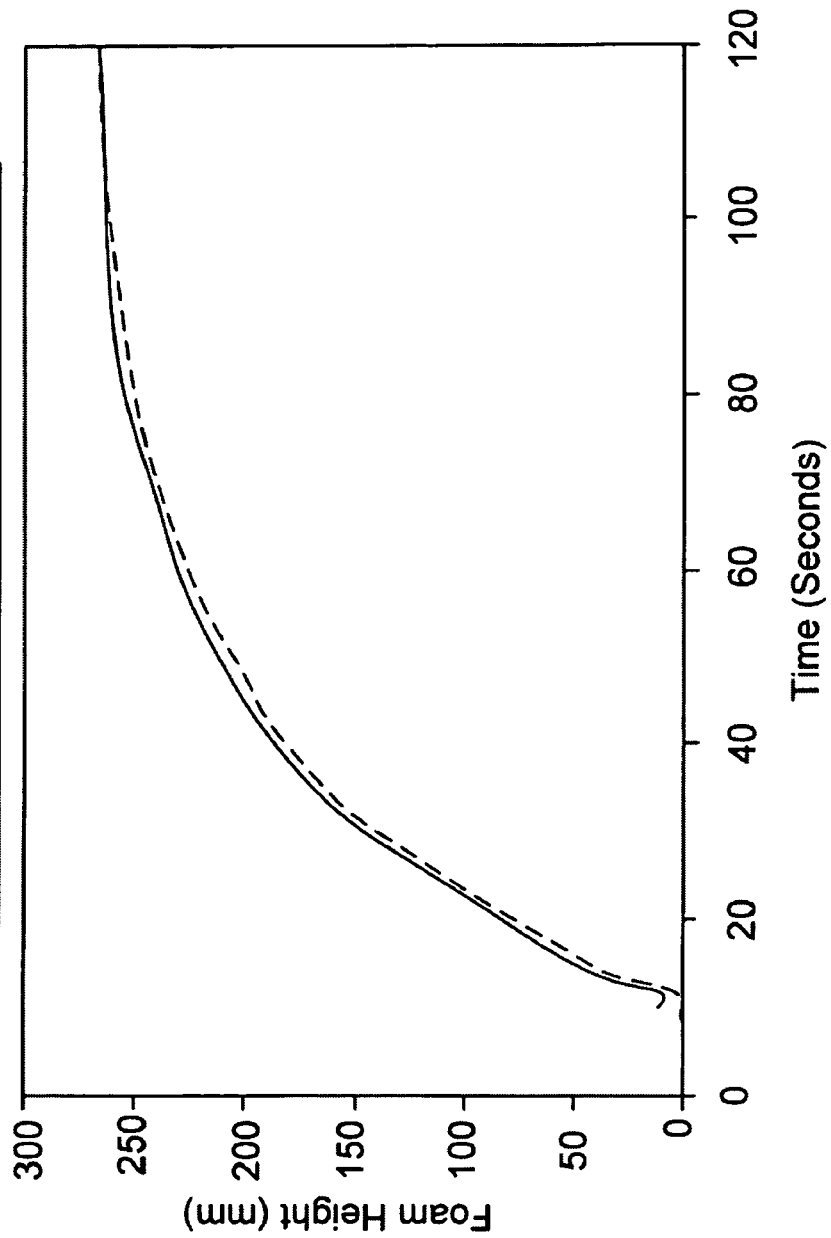

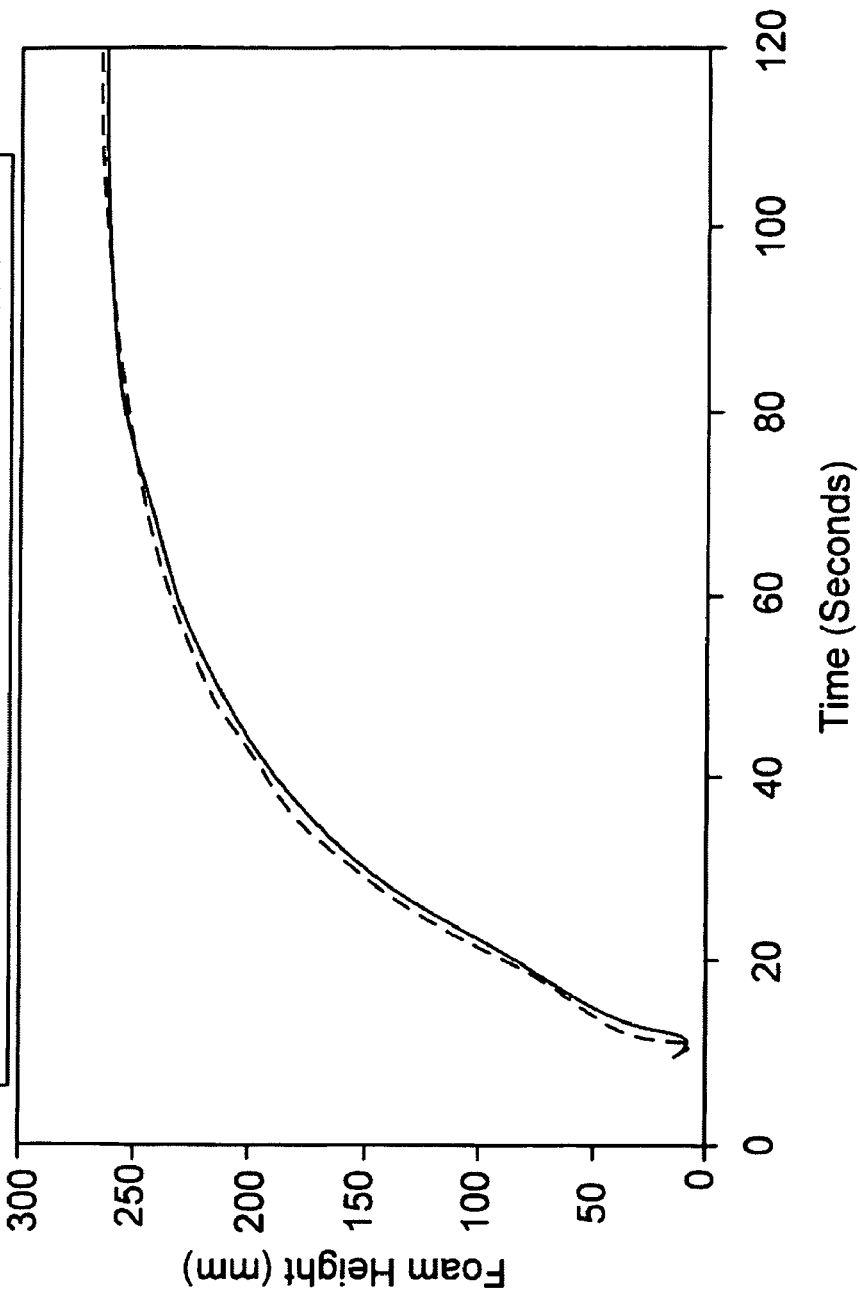

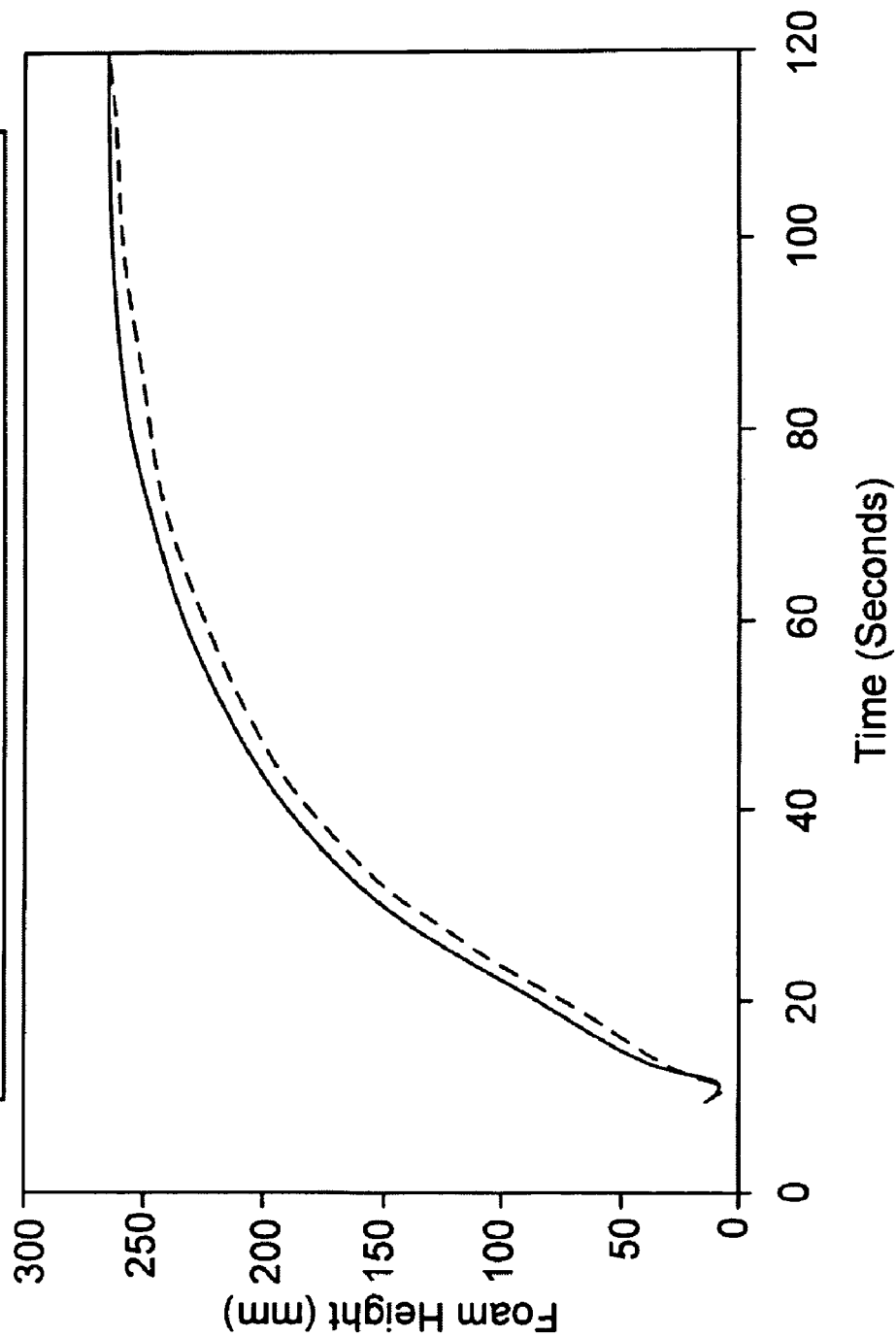

N,N,N,'-TRIMETHYL-BIS-(AMINOETHYL) ETHER AND ITS DERIVATIVES AS CATALYSTS FOR POLYURETHANES

BACKGROUND OF THE INVENTION

The present invention relates generally to N,N,N'-trimethyl-bis-(aminoethyl) ether and derivatives thereof, compositions employing such compounds, polyurethane gel and foam formulations, and methods of making polyurethane gels and foams.

Polyurethane foams are widely known and used in automotive, housing and other industries. Such foams are produced by reacting a polyisocyanate with a polyol in the presence of various additives. One such additive is a chlorofluorocarbon (CFC) blowing agent which vaporizes as a result of the reaction exotherm causing the polymerizing mass to form a foam. The discovery that CFC's deplete ozone in the stratosphere has resulted in mandates diminishing CFC use. Production of water-blown foams, in which blowing is performed with $CO_2$ generated by the reaction of water with the polyisocyanate, has therefore become increasingly important. Certain tertiary amine catalysts have been used in the production of polyurethanes and polyurethane foams. Such tertiary amine catalysts can be used to accelerate both blowing (reaction of water with polyisocyante to generate $CO_2$) and gelling (reaction of polyol with isocyanate).

The ability of the tertiary amine catalyst to selectively promote either blowing or gelling is an important consideration in selecting a catalyst for the production of particular polyurethane foam. If a catalyst promotes the blowing reaction too selectively, much of the $CO_2$ will evolve before sufficient reaction of isocyanate with polyol has occurred. As a result, the $CO_2$ will bubble out of the formulation, resulting in a collapse of the polymerization mass yielding foam of poor quality. In contrast, if a catalyst too strongly promotes the gelling reaction, a substantial portion of the $CO_2$ will evolve after a significant degree of polymerization has occurred. Again, poor quality foams are produced. These foams are generally characterized by high density, broken or poorly defined cells, or other undesirable features. Thus, a balance is needed between reaction of the isocyanate and the polyol (gelling) and the reaction of the isocyanate with water (blowing) in order to produce a polyurethane foam in which the cells are substantially uniform and the foam has suitable properties depending on the anticipated application; for example, rigid foams, semi-rigid foams, and flexible foams.

Tertiary amine catalysts generally are malodorous and offensive and many have high volatility due to their low molecular weight. The release of tertiary amines during foam processing may present safety and toxicity problems, and the release of residual amines from customer products is generally undesirable.

Thus, there exists a need for a catalyst composition that is thermally stable during urethane processing and can produce foams substantially free of volatile amines and/or amine odors. Catalysts containing functionalities capable of reacting with isocyanate are desirable because they can be immobilized in the polyurethane matrix to yield products substantially free of amine emissions. In addition to the isocyanate reactive site, a high molecular weight moiety that imparts low vapor pressure to the amine catalysts is advantageous. Further, it is beneficial for the catalyst composition to promote a balance between the blowing (water-isocyanate) and gelling (polyol-isocyanate) reactions in order to produce foams of good quality and acceptable physical properties. Accordingly, it is to these ends that the present invention is directed.

BRIEF SUMMARY OF THE INVENTION

The present invention is directed to novel compounds having at least one ether linkage or moiety and methods of making such compounds. Compounds in accordance with the present invention have the formula (I):

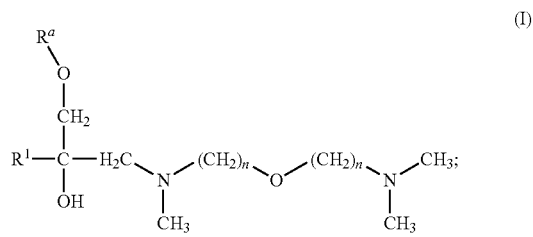

wherein:

n in each occurrence is selected independently from 1, 2, or 3;

$R^1$ is a hydrogen atom or a substituted or unsubstituted $C_1$-$C_5$ alkyl or alkenyl group;

$R^a$ is $R^2$ or —$COR^3$; and $R^2$ and $R^3$ are selected independently from a substituted or unsubstituted $C_1$-$C_{24}$ alkyl, alkenyl, aryl, or aralkyl group.

When $R^a$ is $R^2$, the compounds have the formula (II):

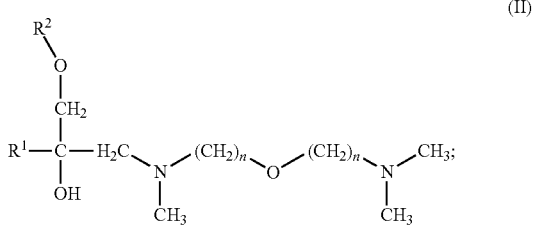

wherein $R^1$, $R^2$, and n are as defined above.

When $R^a$ is —$COR^3$, resulting in an ester moiety, the compounds have the formula (III):

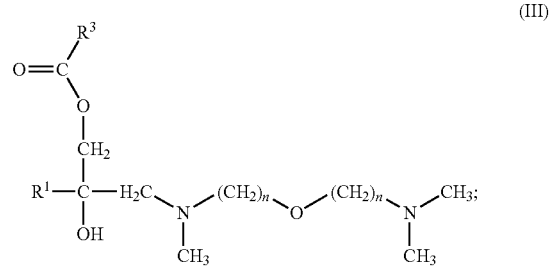

wherein $R^1$, $R^3$, and n are as defined above.

Additionally, the present invention provides compositions comprising at least one compound having the formula (IV):

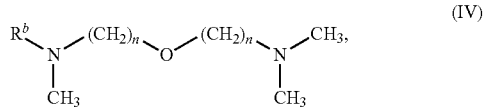

wherein:

n in each occurrence is selected independently from 1, 2, or 3; and $R^b$ is:

a)

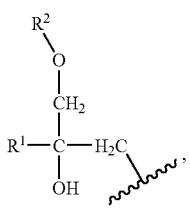

b)

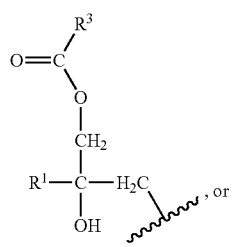

c) a hydrogen atom;

$R^1$ is selected independently from a hydrogen atom or a substituted or unsubstituted $C_1$-$C_5$ alkyl or alkenyl group; and $R^2$ and $R^3$ are selected independently from a substituted or unsubstituted $C_1$-$C_{24}$ alkyl, alkenyl, aryl, or aralkyl group.

When $R^b$ is a hydrogen atom, the compound has the formula (V):

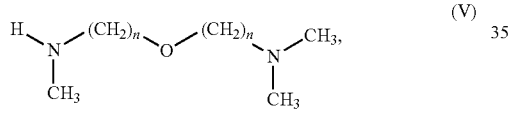   (V)

wherein n in each occurrence is selected independently from 1, 2, or 3.

In one aspect, the compositions comprising at least one compound having the formula (IV) are catalyst compositions, with the proviso that when n in each occurrence is 2, $R^b$ is not a hydrogen atom. These catalyst compositions can be employed to produce polyurethane gels and/or foams. In another aspect, a composition is provided that comprises the contact product of at least one active hydrogen-containing compound and at least one compound having the formula (IV), with the proviso that when n in each occurrence is 2, $R^b$ is not a hydrogen atom. Yet, in another aspect, a composition is provided that comprises the contact product of at least one active hydrogen-containing compound and at least one compound having the formula (IV), wherein when n in each occurrence is selected independently from 1, 2, or 3, $R^b$ can be a hydrogen atom, an ether group, or an ester group, as indicated above. In a further aspect, a composition is provided that comprises the contact product of at least one additive and at least one compound having the formula (IV), with the proviso that when n in each occurrence is 2, $R^b$ is not a hydrogen atom. The at least one additive can be selected from at least one crosslinker, at least one cell stabilizer, at least one flame retardant, at least one chain extender, at least one epoxy resin, at least one acrylic resin, at least one filler, at least one pigment, or any combination thereof. In a still further aspect of the present invention, a composition is provided that comprises the contact product of the at least one additive and at least one compound having the formula (IV), wherein when n in each occurrence is selected independently from 1, 2, or 3, $R^b$ can be a hydrogen atom, an ether group, or an ester group, as indicated above.

The present invention also provides a method of making a polyurethane comprising contacting at least one polyisocyanate with at least one active hydrogen-containing compound in the presence of a catalytically effective amount of a catalyst composition under conditions sufficient to produce the polyurethane. In one aspect, the catalyst composition comprises at least one compound having the formula (IV), with the proviso that when n in each occurrence is 2, $R^b$ is not a hydrogen atom. In another aspect, the catalyst composition comprises at least one compound having the formula (IV), wherein when n in each occurrence is selected independently from 1, 2, or 3, $R^b$ can be a hydrogen atom, an ether group, or an ester group, as indicated above. In a further aspect, a polyurethane foam can be produced when the contacting of the at least one polyisocyanate and the at least one active hydrogen-containing compound occurs in the presence of at least one blowing agent and a catalytically effective amount of a catalyst composition of the present invention under conditions sufficient to produce the polyurethane foam.

For the production of polyurethane foam, the catalyst composition of the present invention offers high activity, promotes a balance between the gelling and blowing reactions, and is substantially free of volatile amines and/or amine odors.

Definitions

The following definitions are provided in order to aid those skilled in the art in understanding the detailed description of the present invention.

PUR—polyurethane.

Isocyanate Index—The actual amount of polyisocyanate used divided by the theoretically required stoichiometric amount of polyisocyanate required to react with all the active hydrogen in the reaction mixture, multiplied by 100. Also known as (Eq NCO/Eq of active hydrogen)× 100.

pphp—parts by weight per hundred weight parts polyol.

pbw—parts by weight.

TMAEE—N,N,N'-trimethyl-bis-(aminoethyl) ether.

BRIEF DESCRIPTION OF THE FIGURES

FIG. 1 presents a plot of the foam height versus time for Foam J and Foam K; Foam K was produced using a catalyst system comprising N,N,N'-trimethyl-N'-(2-hydroxypropyl-butylether)-bis-(aminoethyl) ether (inventive catalyst 4).

FIG. 2 presents a plot of the foam height versus time for Foam J and Foam L; Foam L was produced using a catalyst system comprising N,N,N'-trimethyl-N'-(2-hydroxypropyl-2-ethylhexylether)-bis-(aminoethyl) ether (inventive catalyst 5).

FIG. 3 presents a plot of the foam height versus time for Foam J and Foam M; Foam M was produced using a catalyst system comprising N,N,N'-trimethyl-N'-(2-hydroxypropyl-dodecylether)-bis-(aminoethyl) ether and N,N,N'-trimethyl-N'-(2-hydroxypropyl-tetradecylether)-bis-(aminoethyl) ether (inventive catalyst 6).

DETAILED DESCRIPTION OF THE INVENTION

The present invention discloses novel compounds having at least one ether linkage or moiety, and methods of making these new compounds. The compounds of the present invention have the formula (I):

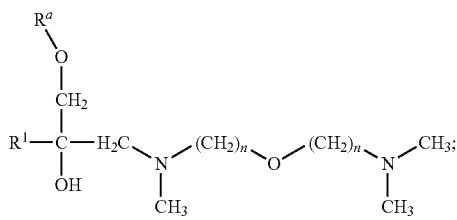
(I)

wherein:

n in each occurrence is selected independently from 1, 2, or 3;

$R^1$ is a hydrogen atom or a substituted or unsubstituted $C_1$-$C_5$ alkyl or alkenyl group;

$R^a$ is $R^2$ or —$COR^3$; and $R^2$ and $R^3$ are selected independently from a substituted or unsubstituted $C_1$-$C_{24}$ alkyl, alkenyl, aryl, or aralkyl group.

When $R^a$ is $R^2$, the compounds have the formula (II):

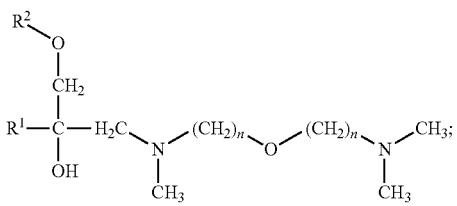
(II)

wherein $R^1$, $R^2$, and n are as defined above.

When $R^a$ is —$COR^3$, resulting in an ester moiety, the compounds have the formula (III):

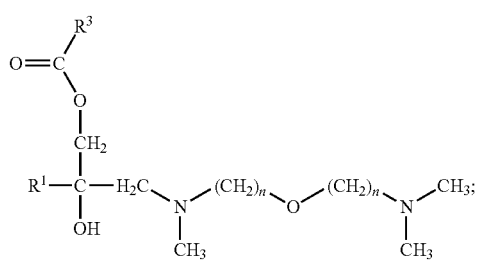
(III)

wherein $R^1$, $R^3$, and n are as defined above.

Additionally, the present invention provides compositions comprising at least one compound having the formula (IV):

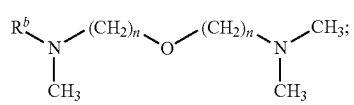
(IV)

wherein:

n in each occurrence is selected independently from 1, 2, or 3; and $R^b$ is:

a)

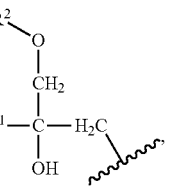

b)

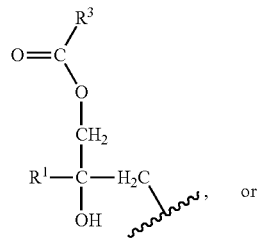

, or c) a hydrogen atom;

$R^1$ is selected independently from a hydrogen atom or a substituted or unsubstituted $C_1$-$C_5$ alkyl or alkenyl group; and $R^2$ and $R^3$ are selected independently from a substituted or unsubstituted $C_1$-$C_{24}$ alkyl, alkenyl, aryl, or aralkyl group.

When $R^b$ is a hydrogen atom, the compounds have the formula (V):

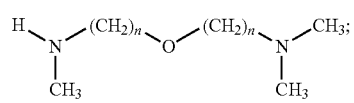
(V)

wherein n is as defined above.

In one aspect, the compositions comprising at least one compound having the formula (IV) are catalyst compositions, with the proviso that when n in each occurrence is 2, $R^b$ is not a hydrogen atom. These catalyst compositions can be employed to produce polyurethane gels and/or foams. In another aspect, a composition is provided that comprises the contact product of at least one active hydrogen-containing compound and at least one compound having the formula (IV), with the proviso that when n in each occurrence is 2, $R^b$ is not a hydrogen atom. Yet, in another aspect, a composition is provided that comprises the contact product of at least one active hydrogen-containing compound and at least one compound having the formula (IV), wherein when n in each occurrence is selected independently from 1, 2, or 3, $R^b$ can be a hydrogen atom, an ether group, or an ester group, as indicated above. In a further aspect, a composition is provided that comprises the contact product of at least one additive and at least one compound having the formula (IV), with the proviso that when n in each occurrence is 2, $R^b$ is not a hydrogen atom. The at least one additive can be selected from at least one crosslinker, at least one cell stabilizer, at least one flame retardant, at least one chain extender, at least one epoxy resin, at least one acrylic resin, at least one filler, at least one pigment, or any combination thereof. In a still further aspect of the present invention, a composition is provided that comprises the contact product of the at least one additive and at least one compound having the formula (IV), wherein when n in each occurrence is selected independently from 1, 2, or 3, $R^b$ can be a hydrogen atom, an ether group, or an ester group, as indicated above.

The present invention also provides a method of making a polyurethane comprising contacting at least one polyisocyanate with at least one active hydrogen-containing compound in the presence of a catalytically effective amount of a catalyst composition under conditions sufficient to produce the polyurethane. In one aspect, the catalyst composition comprises at least one compound having the formula (IV), with the proviso that when n in each occurrence is 2, $R^b$ is not a hydrogen atom. In another aspect, the catalyst composition comprises at least one compound having the formula (IV), wherein when n in each occurrence is selected independently from 1, 2, or 3, $R^b$ can be a hydrogen atom, an ether group, or an ester group, as indicated above. In a further aspect, a polyurethane foam can be produced when the contacting of the at least one polyisocyanate and the at least one active hydrogen-containing compound occurs in the presence of at least one blowing agent and a catalytically effective amount of a catalyst composition of the present invention under conditions sufficient to produce the polyurethane foam.

For the production of polyurethane foam, the catalyst compositions of the present invention offer high activity, promote a balance between the gelling and blowing reactions, and are substantially free of volatile amines and/or amine odors.

Applicants disclose several types of ranges in the present invention. These include, but are not limited to, a range of temperatures; a range of number of atoms; a range of foam density; a range of Isocyanate Index; and a range of pphp for the compositions of the present invention. When Applicants disclose or claim a range of any type, Applicants' intent is to disclose or claim individually each possible number that such a range could reasonably encompass, as well as any subranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "$R^2$" can be an alkyl group having up to 24 carbon atoms, or in language a $C_1$ to $C_{24}$ alkyl group, as used herein, refers to a "$R^2$" group that can be selected independently from an alkyl group having 1, 2, 3, 4, 5, 6, 7, 8, 9, 10, 11, 12, 13, 14, 15, 16, 17, 18, 19, 20, 21, 22, 23, or 24 carbon atoms, as well as any range between these two numbers (for example, a $C_1$ to $C_{18}$ alkyl group), and also including any combination of ranges between these two numbers (for example, a $C_3$ to $C_5$ and $C_7$ to $C_{10}$ alkyl group). Likewise, this applies to all other carbon ranges disclosed herein, for example, $C_1$ to $C_5$ ranges for $R^1$; alkoxy groups having up to 10 carbon atoms; etc.

Similarly, another representative example follows for the parts by weight of a catalyst composition of the present invention per hundred weight parts of the at least one active hydrogen-containing compound in a foam formulation. If the at least one active hydrogen-containing compound is an at least one polyol, the parts by weight per hundred weight parts polyol is abbreviated as pphp. Hence, by the disclosure that the catalyst composition is present in an amount from about 0.01 to about 20 pphp, for example, Applicants intend to recite that the pphp can be selected from about 0.01, about 0.02, about 0.03, about 0.04, about 0.05, about 0.06, about 0.07, about 0.08, about 0.09, about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, about 10, about 11, about 12, about 13, about 14, about 15, about 16, about 17, about 18, about 19, or about 20. Likewise, all other ranges disclosed herein are to be interpreted in a manner similar to these two examples.

Applicants reserve the right to proviso out or exclude any individual members of any such group, including any subranges or combinations of sub-ranges within the group, that may be claimed according to a range or in any similar manner, if for any reason Applicants choose to claim less than the full measure of the disclosure, for example, to account for a reference or an interpretation of a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants are unaware of at the time of the filing of the application.

Another aspect of the present invention provides a thermally stable composition. When used to describe this feature, a compound is defined as thermally stable at a given temperature when it does not decompose or release volatile amines and/or related amine odors at the given temperature. Compositions of the present invention are thermally stable if they comprise compounds having a secondary amine group and/or a secondary hydroxyl group. Not wishing to be bound by theory, it is generally believed that the presence of a secondary amine group and/or a secondary hydroxyl group, which can react with isocyanate, can immobilize the amine moiety during and after the PUR polymerization.

In one aspect of the present invention, the compositions of the present invention have thermal stability up to about 80° C., wherein no or substantially no volatile amine compounds are emitted. In a further aspect, the compositions of the present invention have thermal stability up to about 100° C., up to about 120° C., or up to about 150° C.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or foam formulations described herein. Combining additional components of a composition or a foam formulation can be achieved by any method known to one of skill in the art.

While compositions and methods are described in terms of "comprising" various components or steps, the compositions and methods can also "consist essentially of" or "consist of" the various components or steps.

Compounds having the Formula (II)

The present invention discloses new compounds having at least one ether linkage or moiety, as illustrated by the formula (I):

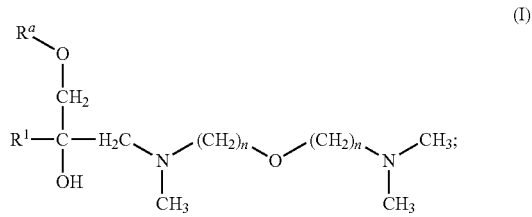

wherein:

n in each occurrence is selected independently from 1, 2, or 3;

$R^1$ is a hydrogen atom or a substituted or unsubstituted $C_1$-$C_5$ alkyl or alkenyl group;

$R^a$ is $R^2$ or —$COR^3$; and $R^2$ and $R^3$ are selected independently from a substituted or unsubstituted $C_1$-$C_{24}$ alkyl, alkenyl, aryl, or aralkyl group.

In one aspect of the present invention, $R^a$ is $R^2$ and the new compounds have the formula (II):

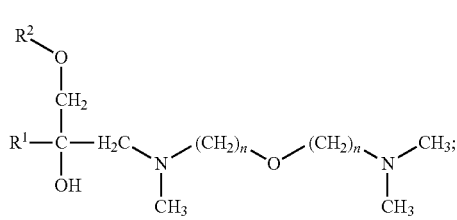

(II)

wherein $R^1$, $R^2$, and n are as defined in formula (I) above.

Unless otherwise specified, alkyl and alkenyl groups described herein are intended to include all structural isomers, linear or branched, of a given structure; for example, all enantiomers and all diasteriomers are included within this definition. As an example, unless otherwise specified, the term propyl is meant to include n-propyl and iso-propyl, while the term butyl is meant to include n-butyl, isobutyl, t-butyl, sec-butyl, and so forth. For instance, non-limiting examples of octyl isomers include 2-ethylhexyl and neooctyl. Similarly, substituted alkyl, alkenyl, aryl, and aralkyl groups described herein are intended to include substituted analogs of a given structure. For example, the substituents on alkyl, alkenyl, aryl, and aralkyl groups can include, but are not limited to, halides; hydroxyl groups; amino groups; alkoxy, alkylamino, or dialkylamino groups having up to 10 carbon atoms; or combinations thereof.

Non-limiting examples of alkyl groups which can be present in new compounds having the formula (II) include methyl, ethyl, propyl, butyl, pentyl, hexyl, heptyl, octyl, nonyl, or decyl, and the like. Examples of alkenyl groups within the scope of the present invention include, but are not limited to, ethenyl, propenyl, butenyl, pentenyl, hexenyl, heptenyl, octenyl, nonenyl, decenyl, and the like. Aryl and aralkyl (aralkyl is defined as an aryl-substituted alkyl or arylalkyl) groups include phenyl, alkyl-substituted phenyl, naphthyl, alkyl-substituted naphthyl, and the like. For example, non-limiting examples of aryl and aralkyl groups useful in the present invention include, but are not limited to, phenyl, tolyl, benzyl, dimethylphenyl, trimethylphenyl, phenylethyl, phenylpropyl, phenylbutyl, propyl-2-phenylethyl, and the like.

According to various aspects of this invention, this disclosure provides compounds according to formula (II), which include but are not limited to, compounds wherein n, $R^1$, and $R^2$ can be selected according to Formulas (A-01) through (A-264) in Table I.

TABLE I

Exemplary selections for n, $R^1$, and $R^2$ for compounds according to this invention, having the formula (II).

| Formula | n | $R^1$ | $R^2$ |
|---|---|---|---|
| A-01 | 1 | hydrogen | ethyl |
| A-02 | 2 | hydrogen | ethyl |
| A-03 | 3 | hydrogen | ethyl |

TABLE I-continued

Exemplary selections for n, $R^1$, and $R^2$ for compounds according to this invention, having the formula (II).

| Formula | n | $R^1$ | $R^2$ |
|---|---|---|---|
| A-04 | 1 | hydrogen | n-propyl |
| A-05 | 2 | hydrogen | n-propyl |
| A-06 | 3 | hydrogen | n-propyl |
| A-07 | 1 | hydrogen | iso-propyl |
| A-08 | 2 | hydrogen | iso-propyl |
| A-09 | 3 | hydrogen | iso-propyl |
| A-10 | 1 | hydrogen | n-butyl |
| A-11 | 2 | hydrogen | n-butyl |
| A-12 | 3 | hydrogen | n-butyl |
| A-13 | 1 | hydrogen | iso-butyl |
| A-14 | 2 | hydrogen | iso-butyl |
| A-15 | 3 | hydrogen | iso-butyl |
| A-16 | 1 | hydrogen | t-butyl |
| A-17 | 2 | hydrogen | t-butyl |
| A-18 | 3 | hydrogen | t-butyl |
| A-19 | 1 | hydrogen | sec-butyl |
| A-20 | 2 | hydrogen | sec-butyl |
| A-21 | 3 | hydrogen | sec-butyl |
| A-22 | 1 | hydrogen | pentyl |
| A-23 | 2 | hydrogen | pentyl |
| A-24 | 3 | hydrogen | pentyl |
| A-25 | 1 | hydrogen | iso-pentyl |
| A-26 | 2 | hydrogen | iso-pentyl |
| A-27 | 3 | hydrogen | iso-pentyl |
| A-28 | 1 | hydrogen | neopentyl |
| A-29 | 2 | hydrogen | neopentyl |
| A-30 | 3 | hydrogen | neopentyl |
| A-31 | 1 | hydrogen | hexyl |
| A-32 | 2 | hydrogen | hexyl |
| A-33 | 3 | hydrogen | hexyl |
| A-34 | 1 | hydrogen | neohexyl |
| A-35 | 2 | hydrogen | neohexyl |
| A-36 | 3 | hydrogen | neohexyl |
| A-37 | 1 | hydrogen | heptyl |
| A-38 | 2 | hydrogen | heptyl |
| A-39 | 3 | hydrogen | heptyl |
| A-40 | 1 | hydrogen | neoheptyl |
| A-41 | 2 | hydrogen | neoheptyl |
| A-42 | 3 | hydrogen | neoheptyl |
| A-43 | 1 | hydrogen | octyl |
| A-44 | 2 | hydrogen | octyl |
| A-45 | 3 | hydrogen | octyl |
| A-46 | 1 | hydrogen | 2-ethylhexyl |
| A-47 | 2 | hydrogen | 2-ethylhexyl |
| A-48 | 3 | hydrogen | 2-ethylhexyl |
| A-49 | 1 | hydrogen | neooctyl |
| A-50 | 2 | hydrogen | neooctyl |
| A-51 | 3 | hydrogen | neooctyl |
| A-52 | 1 | hydrogen | nonyl |
| A-53 | 2 | hydrogen | nonyl |
| A-54 | 3 | hydrogen | nonyl |
| A-55 | 1 | hydrogen | neononyl |
| A-56 | 2 | hydrogen | neononyl |
| A-57 | 3 | hydrogen | neononyl |
| A-58 | 1 | hydrogen | decyl |
| A-59 | 2 | hydrogen | decyl |
| A-60 | 3 | hydrogen | decyl |
| A-61 | 1 | hydrogen | neodecyl |
| A-62 | 2 | hydrogen | neodecyl |
| A-63 | 3 | hydrogen | neodecyl |
| A-64 | 1 | hydrogen | dodecyl |
| A-65 | 2 | hydrogen | dodecyl |
| A-66 | 3 | hydrogen | dodecyl |
| A-67 | 1 | hydrogen | neododecyl |
| A-68 | 2 | hydrogen | neododecyl |
| A-69 | 3 | hydrogen | neododecyl |
| A-70 | 1 | hydrogen | tetradecyl |
| A-71 | 2 | hydrogen | tetradecyl |
| A-72 | 3 | hydrogen | tetradecyl |
| A-73 | 1 | hydrogen | hexadecyl |
| A-74 | 2 | hydrogen | hexadecyl |
| A-75 | 3 | hydrogen | hexadecyl |
| A-76 | 1 | hydrogen | octadecyl |
| A-77 | 2 | hydrogen | octadecyl |
| A-78 | 3 | hydrogen | octadecyl |

TABLE I-continued

Exemplary selections for n, $R^1$, and $R^2$ for compounds according to this invention, having the formula (II).

| Formula | n | $R^1$ | $R^2$ |
|---|---|---|---|
| A-79 | 1 | hydrogen | ethenyl |
| A-80 | 2 | hydrogen | ethenyl |
| A-81 | 3 | hydrogen | ethenyl |
| A-82 | 1 | hydrogen | propenyl |
| A-83 | 2 | hydrogen | propenyl |
| A-84 | 3 | hydrogen | propenyl |
| A-85 | 1 | hydrogen | butenyl |
| A-86 | 2 | hydrogen | butenyl |
| A-87 | 3 | hydrogen | butenyl |
| A-88 | 1 | hydrogen | pentenyl |
| A-89 | 2 | hydrogen | pentenyl |
| A-90 | 3 | hydrogen | pentenyl |
| A-91 | 1 | hydrogen | hexenyl |
| A-92 | 2 | hydrogen | hexenyl |
| A-93 | 3 | hydrogen | hexenyl |
| A-94 | 1 | hydrogen | heptenyl |
| A-95 | 2 | hydrogen | heptenyl |
| A-96 | 3 | hydrogen | heptenyl |
| A-97 | 1 | hydrogen | octenyl |
| A-98 | 2 | hydrogen | octenyl |
| A-99 | 3 | hydrogen | octenyl |
| A-100 | 1 | hydrogen | nonenyl |
| A-101 | 2 | hydrogen | nonenyl |
| A-102 | 3 | hydrogen | nonenyl |
| A-103 | 1 | hydrogen | decenyl |
| A-104 | 2 | hydrogen | decenyl |
| A-105 | 3 | hydrogen | decenyl |
| A-106 | 1 | hydrogen | phenyl |
| A-107 | 2 | hydrogen | phenyl |
| A-108 | 3 | hydrogen | phenyl |
| A-109 | 1 | hydrogen | tolyl |
| A-110 | 2 | hydrogen | tolyl |
| A-111 | 3 | hydrogen | tolyl |
| A-112 | 1 | hydrogen | benzyl |
| A-113 | 2 | hydrogen | benzyl |
| A-114 | 3 | hydrogen | benzyl |
| A-115 | 1 | hydrogen | dimethylphenyl |
| A-116 | 2 | hydrogen | dimethylphenyl |
| A-117 | 3 | hydrogen | dimethylphenyl |
| A-118 | 1 | hydrogen | trimethylphenyl |
| A-119 | 2 | hydrogen | trimethylphenyl |
| A-120 | 3 | hydrogen | trimethylphenyl |
| A-121 | 1 | hydrogen | phenylethyl |
| A-122 | 2 | hydrogen | phenylethyl |
| A-123 | 3 | hydrogen | phenylethyl |
| A-124 | 1 | hydrogen | phenylpropyl |
| A-125 | 2 | hydrogen | phenylpropyl |
| A-126 | 3 | hydrogen | phenylpropyl |
| A-127 | 1 | hydrogen | phenylbutyl |
| A-128 | 2 | hydrogen | phenylbutyl |
| A-129 | 3 | hydrogen | phenylbutyl |
| A-130 | 1 | hydrogen | propyl-2-phenylethyl |
| A-131 | 2 | hydrogen | propyl-2-phenylethyl |
| A-132 | 3 | hydrogen | propyl-2-phenylethyl |
| A-133 | 1 | methyl | ethyl |
| A-134 | 2 | methyl | ethyl |
| A-135 | 3 | methyl | ethyl |
| A-136 | 1 | methyl | n-propyl |
| A-137 | 2 | methyl | n-propyl |
| A-138 | 3 | methyl | n-propyl |
| A-139 | 1 | methyl | iso-propyl |
| A-140 | 2 | methyl | iso-propyl |
| A-141 | 3 | methyl | iso-propyl |
| A-142 | 1 | methyl | n-butyl |
| A-143 | 2 | methyl | n-butyl |
| A-144 | 3 | methyl | n-butyl |
| A-145 | 1 | methyl | iso-butyl |
| A-146 | 2 | methyl | iso-butyl |
| A-147 | 3 | methyl | iso-butyl |
| A-148 | 1 | methyl | t-butyl |
| A-149 | 2 | methyl | t-butyl |
| A-150 | 3 | methyl | t-butyl |
| A-151 | 1 | methyl | sec-butyl |
| A-152 | 2 | methyl | sec-butyl |
| A-153 | 3 | methyl | sec-butyl |
| A-154 | 1 | methyl | pentyl |
| A-155 | 2 | methyl | pentyl |
| A-156 | 3 | methyl | pentyl |
| A-157 | 1 | methyl | iso-pentyl |
| A-158 | 2 | methyl | iso-pentyl |
| A-159 | 3 | methyl | iso-pentyl |
| A-160 | 1 | methyl | neopentyl |
| A-161 | 2 | methyl | neopentyl |
| A-162 | 3 | methyl | neopentyl |
| A-163 | 1 | methyl | hexyl |
| A-164 | 2 | methyl | hexyl |
| A-165 | 3 | methyl | hexyl |
| A-166 | 1 | methyl | neohexyl |
| A-167 | 2 | methyl | neohexyl |
| A-168 | 3 | methyl | neohexyl |
| A-169 | 1 | methyl | heptyl |
| A-170 | 2 | methyl | heptyl |
| A-171 | 3 | methyl | heptyl |
| A-172 | 1 | methyl | neoheptyl |
| A-173 | 2 | methyl | neoheptyl |
| A-174 | 3 | methyl | neoheptyl |
| A-175 | 1 | methyl | octyl |
| A-176 | 2 | methyl | octyl |
| A-177 | 3 | methyl | octyl |
| A-178 | 1 | methyl | 2-ethylhexyl |
| A-179 | 2 | methyl | 2-ethylhexyl |
| A-180 | 3 | methyl | 2-ethylhexyl |
| A-181 | 1 | methyl | neooctyl |
| A-182 | 2 | methyl | neooctyl |
| A-183 | 3 | methyl | neooctyl |
| A-184 | 1 | methyl | nonyl |
| A-185 | 2 | methyl | nonyl |
| A-186 | 3 | methyl | nonyl |
| A-187 | 1 | methyl | neononyl |
| A-188 | 2 | methyl | neononyl |
| A-189 | 3 | methyl | neononyl |
| A-190 | 1 | methyl | decyl |
| A-191 | 2 | methyl | decyl |
| A-192 | 3 | methyl | decyl |
| A-193 | 1 | methyl | neodecyl |
| A-194 | 2 | methyl | neodecyl |
| A-195 | 3 | methyl | neodecyl |
| A-196 | 1 | methyl | dodecyl |
| A-197 | 2 | methyl | dodecyl |
| A-198 | 3 | methyl | dodecyl |
| A-199 | 1 | methyl | neododecyl |
| A-200 | 2 | methyl | neododecyl |
| A-201 | 3 | methyl | neododecyl |
| A-202 | 1 | methyl | tetradecyl |
| A-203 | 2 | methyl | tetradecyl |
| A-204 | 3 | methyl | tetradecyl |
| A-205 | 1 | methyl | hexadecyl |
| A-206 | 2 | methyl | hexadecyl |
| A-207 | 3 | methyl | hexadecyl |
| A-208 | 1 | methyl | octadecyl |
| A-209 | 2 | methyl | octadecyl |
| A-210 | 3 | methyl | octadecyl |
| A-211 | 1 | methyl | ethenyl |
| A-212 | 2 | methyl | ethenyl |
| A-213 | 3 | methyl | ethenyl |
| A-214 | 1 | methyl | propenyl |
| A-215 | 2 | methyl | propenyl |
| A-216 | 3 | methyl | propenyl |
| A-217 | 1 | methyl | butenyl |
| A-218 | 2 | methyl | butenyl |
| A-219 | 3 | methyl | butenyl |
| A-220 | 1 | methyl | pentenyl |
| A-221 | 2 | methyl | pentenyl |
| A-222 | 3 | methyl | pentenyl |
| A-223 | 1 | methyl | hexenyl |
| A-224 | 2 | methyl | hexenyl |
| A-225 | 3 | methyl | hexenyl |
| A-226 | 1 | methyl | heptenyl |
| A-227 | 2 | methyl | heptenyl |
| A-228 | 3 | methyl | heptenyl |

TABLE I-continued

Exemplary selections for n, $R^1$, and $R^2$ for compounds according to this invention, having the formula (II).

| Formula | n | $R^1$ | $R^2$ |
|---|---|---|---|
| A-229 | 1 | methyl | octenyl |
| A-230 | 2 | methyl | octenyl |
| A-231 | 3 | methyl | octenyl |
| A-232 | 1 | methyl | nonenyl |
| A-233 | 2 | methyl | nonenyl |
| A-234 | 3 | methyl | nonenyl |
| A-235 | 1 | methyl | decenyl |
| A-236 | 2 | methyl | decenyl |
| A-237 | 3 | methyl | decenyl |
| A-238 | 1 | methyl | phenyl |
| A-239 | 2 | methyl | phenyl |
| A-240 | 3 | methyl | phenyl |
| A-241 | 1 | methyl | tolyl |
| A-242 | 2 | methyl | tolyl |
| A-243 | 3 | methyl | tolyl |
| A-244 | 1 | methyl | benzyl |
| A-245 | 2 | methyl | benzyl |
| A-246 | 3 | methyl | benzyl |
| A-247 | 1 | methyl | dimethylphenyl |
| A-248 | 2 | methyl | dimethylphenyl |
| A-249 | 3 | methyl | dimethylphenyl |
| A-250 | 1 | methyl | trimethylphenyl |
| A-251 | 2 | methyl | trimethylphenyl |
| A-252 | 3 | methyl | trimethylphenyl |
| A-253 | 1 | methyl | phenylethyl |
| A-254 | 2 | methyl | phenylethyl |
| A-255 | 3 | methyl | phenylethyl |
| A-256 | 1 | methyl | phenylpropyl |
| A-257 | 2 | methyl | phenylpropyl |
| A-258 | 3 | methyl | phenylpropyl |
| A-259 | 1 | methyl | phenylbutyl |
| A-260 | 2 | methyl | phenylbutyl |
| A-261 | 3 | methyl | phenylbutyl |
| A-262 | 1 | methyl | propyl-2-phenylethyl |
| A-263 | 2 | methyl | propyl-2-phenylethyl |
| A-264 | 3 | methyl | propyl-2-phenylethyl |

Notes: (1) Table I only specifies compounds where n is the same in each occurrence.

(2) If an isomeric form of $R^2$ is not specified, that selection of $R^2$ is meant to include all isomeric forms, even if some or all specific isomeric forms are additionally specified in Table I. For example, the selection of octyl is meant to include all isomeric versions of octyl, even though 2-ethylhexyl and neooctyl are specifically listed.

In another aspect, $R^1$ in the compounds having the formula (II) is a hydrogen atom or a methyl group. In yet another aspect, $R^2$ is a methyl, an ethyl, a propyl, a butyl, a pentyl, a hexyl, a heptyl, an octyl, a 2-ethylhexyl, a nonyl, a decyl, a dodecyl, a tetradecyl, a hexadecyl, an octadecyl, a phenyl, a tolyl, or a benzyl group. In still another aspect, n equals 2 in each occurrence.

Illustrative examples of compounds having the formula (II) include, but are not limited to:

N,N,N'-trimethyl-N'-(2-hydroxypropyl-butylether)-bis-(aminoethyl) ether;

N,N,N'-trimethyl-N'-(2-hydroxypropyl-hexylether)-bis-(aminoethyl) ether;

N,N,N'-trimethyl-N'-(2-hydroxypropyl-2-ethylhexylether)-bis-(aminoethyl) ether;

N,N,N'-trimethyl-N'-(2-hydroxypropyl-dodecylether)-bis-(aminoethyl) ether;

N,N,N'-trimethyl-N'-(2-hydroxypropyl-tetradecylether)-bis-(aminoethyl) ether;

N,N,N'-trimethyl-N'-(2-hydroxypropyl-hexadecylether)-bis-(aminoethyl) ether;

N,N,N'-trimethyl-N'-(2-hydroxypropyl-benzylether)-bis-(aminoethyl);

N,N-Dimethylaminopropyl-N'-methyl-N'-(2-hydroxypropyl-butylether)aminoethyl ether;

N,N-Dimethylaminopropyl-N'-methyl-N'-(2-hydroxypropyl-2-ethylhexylether)aminoethyl ether;

N,N-Dimethylaminopropyl-N'-methyl-N'-(2-hydroxypropyl-dodecylether)aminoethyl ether;

N,N-Dimethylaminopropyl-N'-methyl-N'-(2-hydroxypropyl-tetradecylether)aminoethyl ether; and the like.

In accordance with the present invention, a method of making these novel compounds is disclosed. For example, compounds having the formula (II) can be synthesized in accordance with Reaction Scheme A:

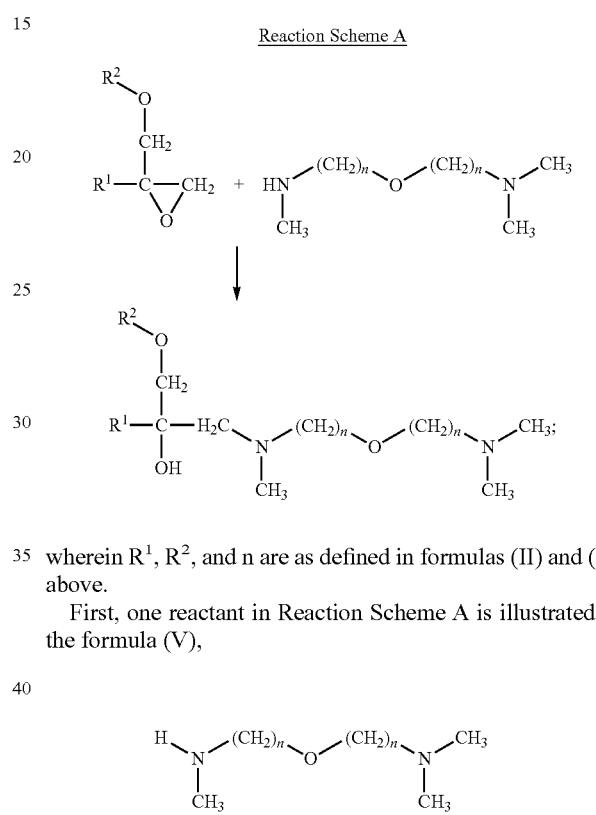

wherein $R^1$, $R^2$, and n are as defined in formulas (II) and (V) above.

First, one reactant in Reaction Scheme A is illustrated in the formula (V),

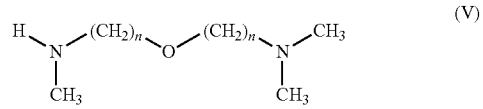

When n equals 2 in each occurrence, the compound having the formula (V) is N,N,N'-trimethyl-bis-(aminoethyl) ether (abbreviated TMAEE). Reactant TMAEE is placed in a temperature-controlled flask with a stir bar and a reflux condenser. TMAEE is heated and a glycidyl ether is added to the flask containing TMAEE and the mixture is stirred substantially constantly. The glycidyl ether can be added to the TMAEE rapidly (i.e., in a few seconds) or slowly added over a period of several hours. In another aspect, the glycidyl ether is added slowly over the course of about 30 minutes, about 1 hour, about 90 minutes, or about 2 hours. Prior to the addition of the glycidyl ether, TMAEE is heated to a temperature in the range of about 50° C. to about 250° C. While this reaction is exothermic, the initial temperature can be maintained substantially constant during the addition of the glycidyl ether. In further aspect of the present invention, TMAEE is heated to and controlled at a temperature in the range of about 80° C. to about 150° C. during the addition of the glycidyl ether.

Once the addition of the glycidyl ether is complete, the reaction mixture can be controlled at a temperature in the range of about 50° C. to about 250° C. In yet another aspect, the reaction mixture can be controlled at a temperature in the range of about 80° C. to about 150° C. The time that it takes for this reaction to reach completion is dependent upon the reaction temperature. The reaction mixture can be tested by gas chromatography (GC), or other analytical methods, to determine when the ether compound having the formula (V)—in this case, TMAEE—has been completely consumed. It is within the scope of the present invention to use an excess of TMAEE reactant, or an excess of the glycidyl ether reactant. However, molar ratios that vary significantly from a molar ratio of about 1:1 can lead to excess unused reactants and potentially unwanted side reactions. Non-limiting examples of the synthesis of new compounds having the formula (II) in accordance with the present invention are illustrated in Examples 4-6 that follow.

Compounds having the Formula (III)

Novel compounds having the formula (I) are disclosed in the present invention:

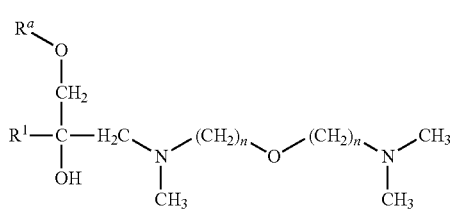

(I)

wherein:

n in each occurrence is selected independently from 1, 2, or 3;

$R^1$ is a hydrogen atom or a substituted or unsubstituted $C_1$-$C_5$ alkyl or alkenyl group;

$R^a$ is $R^2$ or —$COR^3$; and $R^2$ and $R^3$ are selected independently from a substituted or unsubstituted $C_1$-$C_{24}$ alkyl, alkenyl, aryl, or aralkyl group.

In another aspect of the present invention, $R^a$ is —$COR^3$ resulting in an ester moiety and novel compounds having the formula (III):

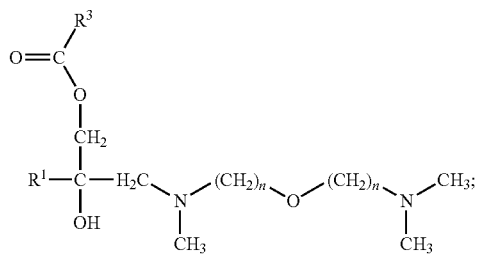

(III)

wherein $R^1$, $R^3$, and n are as defined in formula (I) immediately above.

Unless otherwise specified, alkyl and alkenyl groups described herein are intended to include all structural isomers, linear or branched, of a given structure; for example, all enantiomers and all diasteriomers are included within this definition. As an example, unless otherwise specified, the term propyl is meant to include n-propyl and isopropyl, while the term butyl is meant to include n-butyl, isobutyl, t-butyl, sec-butyl, and so forth. For instance, non-limiting examples of octyl isomers include 2-ethylhexyl and neooctyl. Similarly, substituted alkyl, alkenyl, aryl, and aralkyl groups described herein are intended to include substituted analogs of a given structure. For example, the substituents on alkyl, alkenyl, aryl, and aralkyl groups can include, but are not limited to, halides; hydroxyl groups; amino groups; alkoxy, alkylamino, or dialkylamino groups having up to 10 carbon atoms; or combinations thereof.

Non-limiting examples of alkyl groups which can be present in compounds having the formula (III) include methyl, ethyl, propyl, butyl, pentyl, hexyl, heptyl, octyl, nonyl, or decyl, and the like. Examples of alkenyl groups within the scope of the present invention include, but are not limited to, ethenyl, propenyl, butenyl, pentenyl, hexenyl, heptenyl, octenyl, nonenyl, decenyl, and the like. Aryl and aralkyl (aralkyl is defined as an aryl-substituted alkyl or arylalkyl) groups include phenyl, alkyl-substituted phenyl, naphthyl, alkyl-substituted naphthyl, and the like. For example, non-limiting examples of aryl and aralkyl groups useful in the present invention include, but are not limited to, phenyl, tolyl, benzyl, dimethylphenyl, trimethylphenyl, phenylethyl, phenylpropyl, phenylbutyl, propyl-2-phenylethyl, and the like.

According to various aspects of this invention, this disclosure provides compounds according to formula (III), which include, but are not limited to, compounds wherein n, $R^1$, and $R^3$ can be selected according to Formulas (B-01) through (B-264) in Table II.

TABLE II

Exemplary selections for n, $R^1$, and $R^3$ for compounds according to this invention, having the formula (III).

| Formula | n | $R^1$ | $R^3$ |
|---|---|---|---|
| B-01 | 1 | hydrogen | ethyl |
| B-02 | 2 | hydrogen | ethyl |
| B-03 | 3 | hydrogen | ethyl |
| B-04 | 1 | hydrogen | n-propyl |
| B-05 | 2 | hydrogen | n-propyl |
| B-06 | 3 | hydrogen | n-propyl |
| B-07 | 1 | hydrogen | iso-propyl |
| B-08 | 2 | hydrogen | iso-propyl |
| B-09 | 3 | hydrogen | iso-propyl |
| B-10 | 1 | hydrogen | n-butyl |
| B-11 | 2 | hydrogen | n-butyl |
| B-12 | 3 | hydrogen | n-butyl |
| B-13 | 1 | hydrogen | iso-butyl |
| B-14 | 2 | hydrogen | iso-butyl |
| B-15 | 3 | hydrogen | iso-butyl |
| B-16 | 1 | hydrogen | t-butyl |
| B-17 | 2 | hydrogen | t-butyl |
| B-18 | 3 | hydrogen | t-butyl |
| B-19 | 1 | hydrogen | sec-butyl |
| B-20 | 2 | hydrogen | sec-butyl |
| B-21 | 3 | hydrogen | sec-butyl |
| B-22 | 1 | hydrogen | pentyl |
| B-23 | 2 | hydrogen | pentyl |
| B-24 | 3 | hydrogen | pentyl |
| B-25 | 1 | hydrogen | iso-pentyl |
| B-26 | 2 | hydrogen | iso-pentyl |
| B-27 | 3 | hydrogen | iso-pentyl |
| B-28 | 1 | hydrogen | neopentyl |
| B-29 | 2 | hydrogen | neopentyl |
| B-30 | 3 | hydrogen | neopentyl |
| B-31 | 1 | hydrogen | hexyl |
| B-32 | 2 | hydrogen | hexyl |
| B-33 | 3 | hydrogen | hexyl |
| B-34 | 1 | hydrogen | neohexyl |
| B-35 | 2 | hydrogen | neohexyl |
| B-36 | 3 | hydrogen | neohexyl |
| B-37 | 1 | hydrogen | heptyl |
| B-38 | 2 | hydrogen | heptyl |
| B-39 | 3 | hydrogen | heptyl |
| B-40 | 1 | hydrogen | neoheptyl |
| B-41 | 2 | hydrogen | neoheptyl |
| B-42 | 3 | hydrogen | neoheptyl |

TABLE II-continued

Exemplary selections for n, $R^1$, and $R^3$ for compounds according to this invention, having the formula (III).

| Formula | n | $R^1$ | $R^3$ |
|---|---|---|---|
| B-43 | 1 | hydrogen | octyl |
| B-44 | 2 | hydrogen | octyl |
| B-45 | 3 | hydrogen | octyl |
| B-46 | 1 | hydrogen | 2-ethylhexyl |
| B-47 | 2 | hydrogen | 2-ethylhexyl |
| B-48 | 3 | hydrogen | 2-ethylhexyl |
| B-49 | 1 | hydrogen | neooctyl |
| B-50 | 2 | hydrogen | neooctyl |
| B-51 | 3 | hydrogen | neooctyl |
| B-52 | 1 | hydrogen | nonyl |
| B-53 | 2 | hydrogen | nonyl |
| B-54 | 3 | hydrogen | nonyl |
| B-55 | 1 | hydrogen | neononyl |
| B-56 | 2 | hydrogen | neononyl |
| B-57 | 3 | hydrogen | neononyl |
| B-58 | 1 | hydrogen | decyl |
| B-59 | 2 | hydrogen | decyl |
| B-60 | 3 | hydrogen | decyl |
| B-61 | 1 | hydrogen | neodecyl |
| B-62 | 2 | hydrogen | neodecyl |
| B-63 | 3 | hydrogen | neodecyl |
| B-64 | 1 | hydrogen | dodecyl |
| B-65 | 2 | hydrogen | dodecyl |
| B-66 | 3 | hydrogen | dodecyl |
| B-67 | 1 | hydrogen | neododecyl |
| B-68 | 2 | hydrogen | neododecyl |
| B-69 | 3 | hydrogen | neododecyl |
| B-70 | 1 | hydrogen | tetradecyl |
| B-71 | 2 | hydrogen | tetradecyl |
| B-72 | 3 | hydrogen | tetradecyl |
| B-73 | 1 | hydrogen | hexadecyl |
| B-74 | 2 | hydrogen | hexadecyl |
| B-75 | 3 | hydrogen | hexadecyl |
| B-76 | 1 | hydrogen | octadecyl |
| B-77 | 2 | hydrogen | octadecyl |
| B-78 | 3 | hydrogen | octadecyl |
| B-79 | 1 | hydrogen | ethenyl |
| B-80 | 2 | hydrogen | ethenyl |
| B-81 | 3 | hydrogen | ethenyl |
| B-82 | 1 | hydrogen | propenyl |
| B-83 | 2 | hydrogen | propenyl |
| B-84 | 3 | hydrogen | propenyl |
| B-85 | 1 | hydrogen | butenyl |
| B-86 | 2 | hydrogen | butenyl |
| B-87 | 3 | hydrogen | butenyl |
| B-88 | 1 | hydrogen | pentenyl |
| B-89 | 2 | hydrogen | pentenyl |
| B-90 | 3 | hydrogen | pentenyl |
| B-91 | 1 | hydrogen | hexenyl |
| B-92 | 2 | hydrogen | hexenyl |
| B-93 | 3 | hydrogen | hexenyl |
| B-94 | 1 | hydrogen | heptenyl |
| B-95 | 2 | hydrogen | heptenyl |
| B-96 | 3 | hydrogen | heptenyl |
| B-97 | 1 | hydrogen | octenyl |
| B-98 | 2 | hydrogen | octenyl |
| B-99 | 3 | hydrogen | octenyl |
| B-100 | 1 | hydrogen | nonenyl |
| B-101 | 2 | hydrogen | nonenyl |
| B-102 | 3 | hydrogen | nonenyl |
| B-103 | 1 | hydrogen | decenyl |
| B-104 | 2 | hydrogen | decenyl |
| B-105 | 3 | hydrogen | decenyl |
| B-106 | 1 | hydrogen | phenyl |
| B-107 | 2 | hydrogen | phenyl |
| B-108 | 3 | hydrogen | phenyl |
| B-109 | 1 | hydrogen | tolyl |
| B-110 | 2 | hydrogen | tolyl |
| B-111 | 3 | hydrogen | tolyl |
| B-112 | 1 | hydrogen | benzyl |
| B-113 | 2 | hydrogen | benzyl |
| B-114 | 3 | hydrogen | benzyl |
| B-115 | 1 | hydrogen | dimethylphenyl |
| B-116 | 2 | hydrogen | dimethylphenyl |
| B-117 | 3 | hydrogen | dimethylphenyl |
| B-118 | 1 | hydrogen | trimethylphenyl |
| B-119 | 2 | hydrogen | trimethylphenyl |
| B-120 | 3 | hydrogen | trimethylphenyl |
| B-121 | 1 | hydrogen | phenylethyl |
| B-122 | 2 | hydrogen | phenylethyl |
| B-123 | 3 | hydrogen | phenylethyl |
| B-124 | 1 | hydrogen | phenylpropyl |
| B-125 | 2 | hydrogen | phenylpropyl |
| B-126 | 3 | hydrogen | phenylpropyl |
| B-127 | 1 | hydrogen | phenylbutyl |
| B-128 | 2 | hydrogen | phenylbutyl |
| B-129 | 3 | hydrogen | phenylbutyl |
| B-130 | 1 | hydrogen | propyl-2-phenylethyl |
| B-131 | 2 | hydrogen | propyl-2-phenylethyl |
| B-132 | 3 | hydrogen | propyl-2-phenylethyl |
| B-133 | 1 | methyl | ethyl |
| B-134 | 2 | methyl | ethyl |
| B-135 | 3 | methyl | ethyl |
| B-136 | 1 | methyl | n-propyl |
| B-137 | 2 | methyl | n-propyl |
| B-138 | 3 | methyl | n-propyl |
| B-139 | 1 | methyl | iso-propyl |
| B-140 | 2 | methyl | iso-propyl |
| B-141 | 3 | methyl | iso-propyl |
| B-142 | 1 | methyl | n-butyl |
| B-143 | 2 | methyl | n-butyl |
| B-144 | 3 | methyl | n-butyl |
| B-145 | 1 | methyl | iso-butyl |
| B-146 | 2 | methyl | iso-butyl |
| B-147 | 3 | methyl | iso-butyl |
| B-148 | 1 | methyl | t-butyl |
| B-149 | 2 | methyl | t-butyl |
| B-150 | 3 | methyl | t-butyl |
| B-151 | 1 | methyl | sec-butyl |
| B-152 | 2 | methyl | sec-butyl |
| B-153 | 3 | methyl | sec-butyl |
| B-154 | 1 | methyl | pentyl |
| B-155 | 2 | methyl | pentyl |
| B-156 | 3 | methyl | pentyl |
| B-157 | 1 | methyl | iso-pentyl |
| B-158 | 2 | methyl | iso-pentyl |
| B-159 | 3 | methyl | iso-pentyl |
| B-160 | 1 | methyl | neopentyl |
| B-161 | 2 | methyl | neopentyl |
| B-162 | 3 | methyl | neopentyl |
| B-163 | 1 | methyl | hexyl |
| B-164 | 2 | methyl | hexyl |
| B-165 | 3 | methyl | hexyl |
| B-166 | 1 | methyl | neohexyl |
| B-167 | 2 | methyl | neohexyl |
| B-168 | 3 | methyl | neohexyl |
| B-169 | 1 | methyl | heptyl |
| B-170 | 2 | methyl | heptyl |
| B-171 | 3 | methyl | heptyl |
| B-172 | 1 | methyl | neoheptyl |
| B-173 | 2 | methyl | neoheptyl |
| B-174 | 3 | methyl | neoheptyl |
| B-175 | 1 | methyl | octyl |
| B-176 | 2 | methyl | octyl |
| B-177 | 3 | methyl | octyl |
| B-178 | 1 | methyl | 2-ethylhexyl |
| B-179 | 2 | methyl | 2-ethylhexyl |
| B-180 | 3 | methyl | 2-ethylhexyl |
| B-181 | 1 | methyl | neooctyl |
| B-182 | 2 | methyl | neooctyl |
| B-183 | 3 | methyl | neooctyl |
| B-184 | 1 | methyl | nonyl |
| B-185 | 2 | methyl | nonyl |
| B-186 | 3 | methyl | nonyl |
| B-187 | 1 | methyl | neononyl |
| B-188 | 2 | methyl | neononyl |
| B-189 | 3 | methyl | neononyl |
| B-190 | 1 | methyl | decyl |
| B-191 | 2 | methyl | decyl |
| B-192 | 3 | methyl | decyl |

TABLE II-continued

Exemplary selections for n, $R^1$, and $R^3$ for compounds according to this invention, having the formula (III).

| Formula | n | $R^1$ | $R^3$ |
|---|---|---|---|
| B-193 | 1 | methyl | neodecyl |
| B-194 | 2 | methyl | neodecyl |
| B-195 | 3 | methyl | neodecyl |
| B-196 | 1 | methyl | dodecyl |
| B-197 | 2 | methyl | dodecyl |
| B-198 | 3 | methyl | dodecyl |
| B-199 | 1 | methyl | neododecyl |
| B-200 | 2 | methyl | neododecyl |
| B-201 | 3 | methyl | neododecyl |
| B-202 | 1 | methyl | tetradecyl |
| B-203 | 2 | methyl | tetradecyl |
| B-204 | 3 | methyl | tetradecyl |
| B-205 | 1 | methyl | hexadecyl |
| B-206 | 2 | methyl | hexadecyl |
| B-207 | 3 | methyl | hexadecyl |
| B-208 | 1 | methyl | octadecyl |
| B-209 | 2 | methyl | octadecyl |
| B-210 | 3 | methyl | octadecyl |
| B-211 | 1 | methyl | ethenyl |
| B-212 | 2 | methyl | ethenyl |
| B-213 | 3 | methyl | ethenyl |
| B-214 | 1 | methyl | propenyl |
| B-215 | 2 | methyl | propenyl |
| B-216 | 3 | methyl | propenyl |
| B-217 | 1 | methyl | butenyl |
| B-218 | 2 | methyl | butenyl |
| B-219 | 3 | methyl | butenyl |
| B-220 | 1 | methyl | pentenyl |
| B-221 | 2 | methyl | pentenyl |
| B-222 | 3 | methyl | pentenyl |
| B-223 | 1 | methyl | hexenyl |
| B-224 | 2 | methyl | hexenyl |
| B-225 | 3 | methyl | hexenyl |
| B-226 | 1 | methyl | heptenyl |
| B-227 | 2 | methyl | heptenyl |
| B-228 | 3 | methyl | heptenyl |
| B-229 | 1 | methyl | octenyl |
| B-230 | 2 | methyl | octenyl |
| B-231 | 3 | methyl | octenyl |
| B-232 | 1 | methyl | nonenyl |
| B-233 | 2 | methyl | nonenyl |
| B-234 | 3 | methyl | nonenyl |
| B-235 | 1 | methyl | decenyl |
| B-236 | 2 | methyl | decenyl |
| B-237 | 3 | methyl | decenyl |
| B-238 | 1 | methyl | phenyl |
| B-239 | 2 | methyl | phenyl |
| B-240 | 3 | methyl | phenyl |
| B-241 | 1 | methyl | tolyl |
| B-242 | 2 | methyl | tolyl |
| B-243 | 3 | methyl | tolyl |
| B-244 | 1 | methyl | benzyl |
| B-245 | 2 | methyl | benzyl |
| B-246 | 3 | methyl | benzyl |
| B-247 | 1 | methyl | dimethylphenyl |
| B-248 | 2 | methyl | dimethylphenyl |
| B-249 | 3 | methyl | dimethylphenyl |
| B-250 | 1 | methyl | trimethylphenyl |
| B-251 | 2 | methyl | trimethylphenyl |
| B-252 | 3 | methyl | trimethylphenyl |
| B-253 | 1 | methyl | phenylethyl |
| B-254 | 2 | methyl | phenylethyl |
| B-255 | 3 | methyl | phenylethyl |
| B-256 | 1 | methyl | phenylpropyl |
| B-257 | 2 | methyl | phenylpropyl |
| B-258 | 3 | methyl | phenylpropyl |
| B-259 | 1 | methyl | phenylbutyl |
| B-260 | 2 | methyl | phenylbutyl |
| B-261 | 3 | methyl | phenylbutyl |
| B-262 | 1 | methyl | propyl-2-phenylethyl |
| B-263 | 2 | methyl | propyl-2-phenylethyl |
| B-264 | 3 | methyl | propyl-2-phenylethyl |

Notes: (1) Table II only specifies compounds where n is the same in each occurrence.

(2) If an isomeric form of $R^3$ is not specified, that selection of $R^3$ is meant to include all isomeric forms, even if some or all specific isomeric forms are additionally specified in Table II. For example, the selection of octyl is meant to include all isomeric versions of octyl, even though 2-ethylhexyl and neooctyl are specifically listed.

In another aspect, $R^1$ in the compounds having the formula (III) is a hydrogen atom or a methyl group. In yet another aspect, $R^3$ is a methyl, an ethyl, a propyl, a butyl, a pentyl, a hexyl, a heptyl, an octyl, a 2-ethylhexyl, a nonyl, a decyl, a dodecyl, a tetradecyl, a hexadecyl, an octadecyl, a phenyl, a tolyl, or a benzyl group. In still another aspect, the integer n equals 2 in each occurrence.

Illustrative examples of the new compounds having the formula (III) include, but are not limited to:

N,N,N'-trimethyl-N'-(2-hydroxypropyl-butylester)-bis-(aminoethyl) ether;

N,N,N'-trimethyl-N'-(2-hydroxypropyl-2-ethylhexylester)-bis-(aminoethyl) ether;

N,N,N'-trimethyl-N'-(2-hydroxypropyl-neodecylester)-bis-(aminoethyl) ether;

N,N,N'-trimethyl-N'-(2-hydroxypropyl-dodecylester)-bis-(aminoethyl) ether;

N,N,N'-trimethyl-N'-(2-hydroxypropyl-tetradecylester)-bis-(aminoethyl) ether;

N,N,N'-trimethyl-N'-(2-hydroxypropyl-octadecylester)-bis-(aminoethyl) ether;

N,N,N'-trimethyl-N'-(2-hydroxypropyl-benzylester)-bis-(aminoethyl) ether;

N,N-Dimethylaminopropyl-N'-methyl-N'-(2-hydroxypropyl-butylester)aminoethyl ether;

N,N-Dimethylaminopropyl-N'-methyl-N'-(2-hydroxypropyl-2-ethylhexylester)aminoethyl ether;

N,N-Dimethylaminopropyl-N'-methyl-N'-(2-hydroxypropyl-dodecylester)aminoethyl ether;

N,N-Dimethylaminopropyl-N'-methyl-N'-(2-hydroxypropyl-tetradecylester)aminoethyl ether; and the like.

In accordance with the present invention, a method of making these novel compounds is disclosed. For example, compounds having the formula (III) can be synthesized in accordance with Reaction Scheme B:

Reaction Scheme B

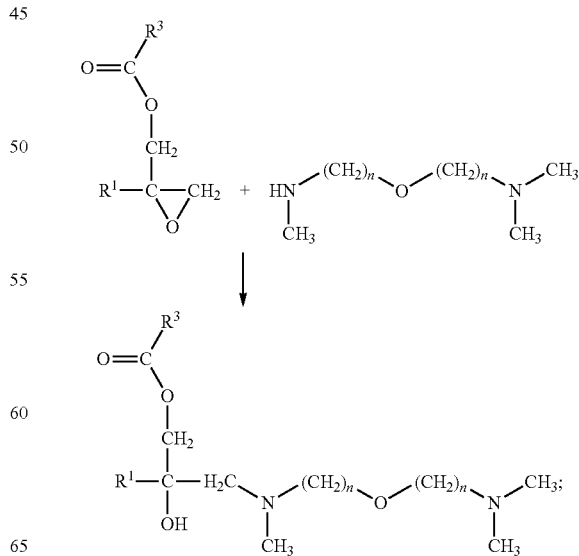

wherein $R^1$, $R^3$, and n are as defined in formulas (III) and (V) above.

First, one reactant in Reaction Scheme B is illustrated in the formula (V),

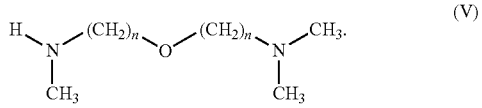

When n equals 2 in each occurrence, the compound having the formula (V) is TMAEE. Reactant TMAEE is placed in a temperature-controlled flask with a stir bar and a reflux condenser. TMAEE is heated and a glycidyl ester is added to the flask containing TMAEE and the mixture is stirred substantially constantly. The glycidyl ester can be added to the TMAEE rapidly (i.e., in a few seconds) or slowly added over the period of several hours. In another aspect, the glycidyl ester is added slowly over the course of about 30 minutes, about 1 hour, about 90 minutes, or about 2 hours. Prior to the addition of the glycidyl ester, TMAEE is heated to a temperature in the range of about 50° C. to about 250° C. While this reaction is exothermic, the initial temperature can be maintained substantially constant during the addition of the glycidyl ester. In further aspect of the present invention, TMAEE is heated to and controlled at a temperature in the range of about 80° C. to about 150° C. during the addition of the glycidyl ester.

Once the addition of the glycidyl ester is complete, the reaction mixture can controlled at a temperature in the range of about 50° C. to about 250° C. In yet another aspect, the reaction mixture can be controlled at a temperature in the range of about 80° C. to about 150° C. The time that it takes for this reaction to reach completion is dependent upon the reaction temperature. The reaction mixture can be tested by gas chromatography (GC), or other analytical methods, to determine when the ether compound having the formula (V)—in this case, TMAEE—has been completely consumed. It is within the scope of the present invention to use an excess of TMAEE reactant, or an excess of the glycidyl ester reactant. However, molar ratios that vary significantly from a molar ratio of about 1:1 can lead to excess unused reactants and potentially unwanted side reactions. A constructive example of the synthesis of a new compound having the formula (III) in accordance with the present invention is illustrated in Constructive Example 7 that follows.

Compositions

In yet another aspect of the present invention, compositions are provided that comprise at least one compound having the formula (IV):

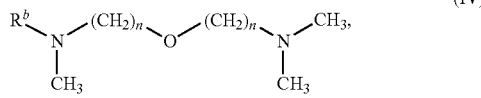

wherein:

n in each occurrence is selected independently from 1, 2, or 3; and $R^b$ is:

a)

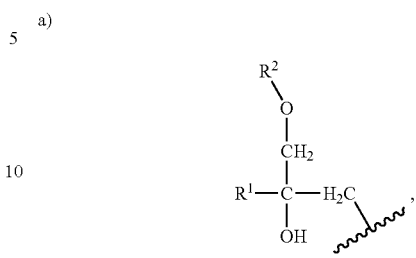

b)

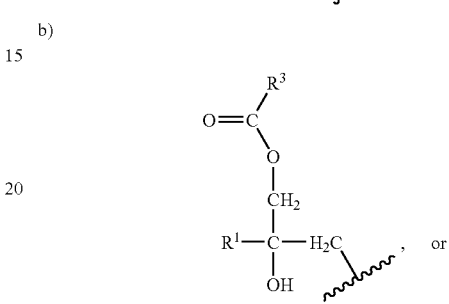

c) a hydrogen atom;

$R^1$ is selected independently from a hydrogen atom or a substituted or unsubstituted $C_1$-$C_5$ alkyl or alkenyl group; and $R^2$ and $R^3$ are selected independently from a substituted or unsubstituted $C_1$-$C_{24}$ alkyl, alkenyl, aryl, or aralkyl group.

When $R^b$ is the ether moiety, the compounds have the formula (II):

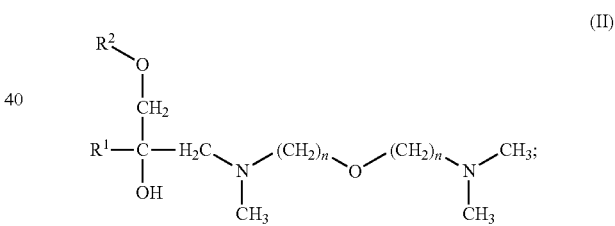

wherein $R^1$, $R^2$, and n are as defined immediately above.

When $R^b$ is the ester moiety, the compounds have the formula (III):

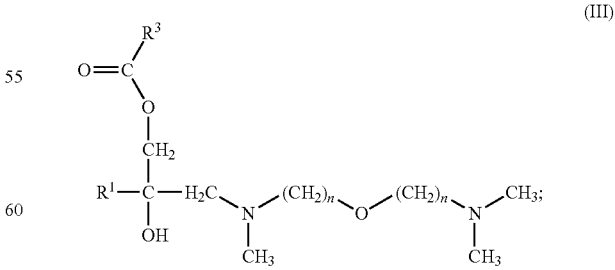

wherein $R^1$, $R^3$, and n are as defined immediately above.

When $R^b$ is a hydrogen atom, the compounds have the formula (V):

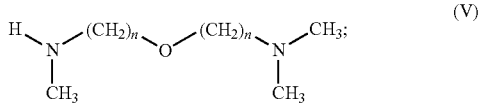

(V)

wherein n in each occurrence is selected independently from 1, 2, or 3. In one aspect, when n is 2 in each occurrence, the ether compound of formula (V) is N,N,N'-trimethyl-bis-(aminoethyl) ether (TMAEE). In another aspect, the ether compound of formula (V) is N,N-dimethylaminopropyl-N'-methylaminoethyl ether.

In a further aspect, the compositions comprising at least one compound having the formula (IV) are catalyst compositions, with the proviso that when n in each occurrence is 2, $R^b$ is not a hydrogen atom. These catalyst compositions can be employed to produce polyurethane gels and/or foams. Also within the scope of the present invention are compositions that comprise the contact product of at least one active hydrogen-containing compound and at least one compound having the formula (IV), with the proviso that when n in each occurrence is 2, $R^b$ is not a hydrogen atom. In another aspect of the present invention, a composition is provided that comprises the contact product of at least one active hydrogen-containing compound and at least one compound having the formula (IV), wherein when n in each occurrence is selected independently from 1, 2, or 3, $R^b$ can be a hydrogen atom, an ether group, or an ester group, as indicated above. In yet another aspect, a composition is provided that comprises the contact product of at least one additive and at least one compound having the formula (IV), with the proviso that when n in each occurrence is 2, $R^b$ is not a hydrogen atom. The at least one additive can be selected from at least one crosslinker, at least one cell stabilizer, at least one flame retardant, at least one chain extender, at least one epoxy resin, at least one acrylic resin, at least one filler, at least one pigment, or any combination thereof. In still another aspect of the present invention, a composition is provided that comprises the contact product of the at least one additive and at least one compound having the formula (IV), wherein when n in each occurrence is selected independently from 1, 2, or 3, $R^b$ can be a hydrogen atom, an ether group, or an ester group, as indicated above.

Generally, polyurethane foam catalyst compositions can comprise compounds which accelerate both the blowing (water-isocyanate) and gelling (polyol-isocyanate) reactions. It is beneficial to balance these reactions in order to produce quality foams with acceptable properties. Compositions of the present invention can comprise a single compound which accelerates, but keeps in balance, both the blowing and gelling reactions. Alternatively, the composition can further comprise at least one catalyst that predominantly accelerates the blowing reaction (a blowing catalyst), at least one other catalyst that predominantly accelerates the gelling reaction (a gelling catalyst), or a combination thereof. As described herein, a blowing catalyst is a catalyst that predominantly accelerates the blowing reaction, but can also, in certain circumstances, accelerate the gelling reaction, albeit to a lesser degree. Similarly, a gelling catalyst is a catalyst that predominantly accelerates the gelling reaction, but can also, in certain circumstances, accelerate the blowing reaction, albeit to a lesser degree.

Optional urethane catalysts that are suitable for use in the compositions described herein include, but are not limited to, metal salt catalysts, organometallic compounds, compounds with amine functionality, or combination thereof. Non-limiting metal salt catalysts and organometallic compounds include organotins, organobismuths, tin salts, bismuth salts, and the like, or any combination thereof. Optional amine compounds can include, for example, gelling catalysts such as triethylenediamine (TEDA), N-methylimidazole, 1,2-dimethylimidazole, N-methylmorpholine (commercially available as the DABCO® NMM catalyst), N-ethylmorpholine (commercially available as the DABCO® NEM catalyst), triethylamine (commercially available as the DABCO® TETN catalyst), N,N'-dimethylpiperazine, 1,3,5-tris(dimethylaminopropyl)hexahydrotriazine (commercially available as the Polycat® 41 catalyst), 2,4,6-tris(dimethylaminomethyl)phenol (commercially available as the DABCO TMR® 30 catalyst), N-methyldicyclohexylamine (commercially available as the Polycat® 12 catalyst), pentamethyldipropylene triamine (commercially available as the Polycat® 77 catalyst), N-methyl-N'-(2-dimethylamino)-ethyl-piperazine, tributylamine, dimethylaminocyclohexylamine (commercially available as the Polycat® 8 catalyst), pentamethyldipropylene-triamine, triethanolamine, dimethylethanolamine, tris(3-dimethylamino)propylamine (commercially available as the Polycat® 9 catalyst), 1,8-diazabicyclo[5.4.0] undecene (commercially available as the DABCO® DBU catalyst or its acid blocked derivatives, and the like, as well as any combination thereof. Further, such optional urethane catalysts can include, for example, blowing catalysts. Blowing catalysts include, but are not limited to, pentamethyldiethylenetriamine (commercially available as the Polycat® 5 catalyst), hexamethyltriethylenetetramine, heptamethyltetraethylenepentamine, bis(dimethylaminoethyl)ether (commercially available as the DABCO® BL19 catalyst, and the like, as well as any combination thereof. As noted earlier, some of these optional catalysts can accelerate both the gelling and blowing reactions. Additionally, some of these optional catalysts also can accelerate the trimerization reaction, i.e., the reaction of polyisocyanates to form polyisocyanurates. Although not a requirement, compositions comprising compounds having the formula (IV) can further comprise other catalytic materials, such as carboxylate salts, which can accelerate the trimerization reaction.

With respect to the present invention, when a quantity by weight of a catalyst composition is discussed, the quantity will include the total amount of all catalysts, unless stated otherwise. As an example, if 0.8 pphp of a gelling catalyst and 0.7 pphp of a blowing catalyst are used in a given catalyst composition, the amount of the total polyurethane foam catalyst is 1.5 pphp.

Polyisocyanates

Polyisocyanates that are useful in the polyurethane gel or foam formation process include, but are not limited to, hexamethylene diisocyanate, isophorone diisocyanate, phenylene diisocyante, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's. In yet another aspect, the polyisocyanate is MDI, TDI, or a combination thereof.

The compositions and the methods of making PUR foam of the present invention can be used to produce many types of foam. The compositions are useful, for example, in the formation of foam products for rigid, semi-rigid, and flexible applications, each of which can require a different Isocyanate Index. As defined previously, Isocyanate Index is the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms.

Foam products which are produced with an Isocyanate Index from about 40 to about 500 are within the scope of this invention. In accordance with other aspects of the present invention, the Isocyanate Index is from about 50 to about 300, from about 60 to about 200, or from about 70 to about 115.

Polyols

Active hydrogen-containing compounds for use with the foregoing polyisocyanates in forming the polyurethane foams of this invention can be any of those organic compounds having at least two hydroxyl groups such as, for example, polyols. Polyols that are typically used in PUR foam formation processes include polyalkylene ether and polyester polyols. The polyalkylene ether polyol includes the poly (alkyleneoxide) polymers such as poly(ethyleneoxide) and poly(propyleneoxide) polymers and copolymers with terminal hydroxyl groups derived from polyhydric compounds, including diols and triols, Polyols include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and like low molecular weight polyols, or a combination thereof.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of di- and tri-functional materials and/or different molecular weight or different chemical composition materials can be used. In yet another aspect of the present invention, polyester polyols can be used, including those produced when a dicarboxylic acid is reacted with an excess of a diol. Non-limiting examples include adipic acid or phathalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

In addition to polyester and polyether polyols, the masterbatches, or premix compositions, frequently contain a polymer polyol. Polymer polyols can be used, for example, in polyurethane foams to increase the foam's resistance to deformation, i.e., to increase the load-bearing properties of the foam. Suitable polymer polyols include, but are not limited to, graft polyols, polyurea modified polyols, and the like, or mixtures thereof. A graft polyol can be a triol in which vinyl monomers, such as styrene and acrylonitrile, are graft copolymerized. A polyurea modified polyol can be a polyol containing a polyurea dispersion formed by the reaction of a diamine with TDI. TDI is used often in excess, so some of the TDI may react with both the polyol and polyurea. A variation of the polyurea modified polyol is abbreviated PIPA polyol, and is formed by the in-situ polymerization of TDI and alkanolamine in the polyol.

In another aspect, the at least one active hydrogen-containing compound that is useful in the compositions or formulations of the present invention is an at least one polyether polyol, at least one polyester polyol, at least one polymer polyol, or any combination thereof. Depending on the load-bearing requirements and the particular end-use application of the foam, polymer polyols can be absent from the premix or foam formulation, or can comprise up to about 100 percent of the polyol portion of the premix or foam formulation. In another aspect, polymer polyols can comprise from about 10 percent to about 80 percent, or from about 25 percent to about 65 percent, of the polyol portion of the premix composition or foam formulation.

Blowing Agents

Blowing agents that can be used alone or in combination in the PUR foam formation process include, but are not limited to, water, methylene chloride, acetone, chlorofluorocarbons (CFCs), hydrofluorocarbons (HFCs), hydrochlorofluorocarbons (HCFCs), and hydrocarbons. Non-limiting examples of HFCs include HFC-245fa, HFC-134a, and HFC-365. Illustrative examples of HCFCs include HCFC-141b, HCFC-22, and HCFC-123. Exemplary hydrocarbons include n-pentane, isopentane, cyclopentane, and the like, or any combination thereof.

The amount of blowing agent used can vary based on, for example, the intended use and application of the foam product and the desired foam stiffness and density. In the foam formulations and methods for preparing polyurethane foams of the present invention, the blowing agent is present in amounts from about 0.5 to about 20 parts by weight per hundred weight parts polyol (pphp), from about 1 to about 15 pphp, from about 1.5 to about 10 pphp, or from about 2 to about 5 pphp. If water is present in the formulation, for use as a blowing agent or otherwise, water is present in amounts up to about 20 pphp. In other words, water can range from 0 to about 20 pphp. In another aspect, water can range from 0 to about 15 pphp, from 0 to about 12 pphp, from 0 to about 8 pphp, or from 0 to about 4 pphp.

Miscellaneous Additives

Depending upon on the requirements during foam manufacturing or for the end-use application of the foam product, various additives can be employed in the compositions and PUR foam formulations to tailor specific properties. These include, but are not limited to, crosslinkers, cell stabilizers, flame retardants, chain extenders, epoxy resins, acrylic resins, fillers, pigments, or any combination thereof. It is understood that other mixtures or materials that are known in the art can be included in the compositions and foam formulations and are within the scope of the present invention.

Suitable crosslinkers include, but are not limited to, diethanolamine, diisopropanolamine, triethanolamine, tripropanolamine, and the like, or any combination thereof. Crosslinkers also can function as urethane catalysts due to the presence of an amine group in their chemical structure. Crosslinkers can be present in the foam formulation in amounts from about 0.05 to about 10 pphp, about 0.1 to about 8 pphp, about 0.2 to about 6 pphp, about 0.3 to about 4 pphp, about 0.4 to about 3 pphp, or about 0.5 to about 2 pphp. Cell stabilizers include surfactants such as organopolysiloxanes. Silicon surfactants can be present in the foam formulation in amounts from about 0.5 to about 10 pphp, about 0.6 to about 9 pphp, about 0.7 to about 8 pphp, about 0.8 to about 7 pphp, about 0.9 to about 6 pphp, about 1 to about 5 pphp, or about 1.1 to about 4 pphp. Useful flame retardants include halogenated organophosphorous compounds and non-halogenated compounds. A non-limiting example of a halogenated flame retardant is trichloropropylphosphate (TCPP). For example, triethylphosphate ester (TEP) and DMMP are non-halogenated flame retardants. Depending on the end-use foam application, flame retardants can be present in the foam formulation in amounts from 0 to about 50 pphp, from 0 to about 40 pphp, from 0 to about 30 pphp, or from 0 to about 20 pphp. In another aspect, the flame retardant is present from 0 to about 15 pphp, 0 to about 10 pphp, 0 to about 7 pphp, or 0 to about 5 pphp. Chain extenders such as ethylene glycol and butane diol can also be employed in the present invention.

Polyurethane and Polyurethane Foam Formulation and Process

The catalyst compositions according to the present invention can catalyze the reaction between an isocyanate functionality and an active hydrogen-containing compound (e.g., an alcohol, a polyol, an amine, water) and especially the urethane (gelling) reaction of polyol hydroxyl groups with isocyanate to make polyurethanes and the blowing reaction of water with isocyanate to release carbon dioxide for making polyurethane foam.

Catalyst compositions comprising at least one compound having the formula (IV) are present in the PUR gel or foam formulation in a catalytically effective amount. In the PUR formulations of the present invention, the catalyst composition is present in amounts from about 0.01 to about 20 parts by weight per hundred weight parts of the at least one active hydrogen-containing compound. In another aspect, the catalyst composition is present in amounts from about 0.05 to about 15 parts, from about 0.1 to about 10 parts, from about 0.15 to about 5 parts, or from about 0.25 to about 2 parts, by weight per hundred weight parts of the at least one active hydrogen-containing compound. If the at least one active hydrogen-containing compound is an at least one polyol, the catalyst composition is present in amounts from about 0.01 to about 20 parts by weight per hundred weight parts polyol (pphp). In another aspect, the catalyst composition is present in amounts from about 0.05 to about 15 pphp, about 0.1 to about 10 pphp, about 0.15 to about 5 pphp, about 0.2 to about 4 pphp, or about 0.25 to about 2 pphp. The catalyst composition can further comprise additional urethane catalysts, such as gelling catalysts, blowing catalysts, or a combination thereof.

In accordance with the present invention, a method of making a polyurethane is provided that comprises contacting at least one polyisocyanate with at least one active hydrogen-containing compound in the presence of a catalytically effective amount of a catalyst composition under conditions sufficient to produce the polyurethane. The conditions sufficient to produce the polyurethane would be readily known to one of ordinary skill in the art. In one aspect, the catalyst composition comprises at least one compound having the formula (IV), with the proviso that when n in each occurrence is 2, $R^b$ is not a hydrogen atom. In another aspect, the catalyst composition comprises at least one compound having the formula (IV), wherein when n in each occurrence is selected independently from 1, 2, or 3, $R^b$ can be a hydrogen atom, an ether group, or an ester group, as indicated previously.

In a further aspect, a polyurethane foam can be produced by contacting at least one polyisocyanate and at least one active hydrogen-containing compound in the presence of at least one blowing agent and a catalytically effective amount of a catalyst composition of the present invention under conditions sufficient to produce the polyurethane foam. The conditions sufficient to produce the polyurethane foam would be readily known to one of ordinary skill in the art. For instance, activation of the blowing agent can occur at a specific reaction temperature, or the blowing agent can react with isocyanate, for example, if the blowing agent comprises water.

Additionally, the contacting of the at least one polyisocyanate and the at least one active hydrogen-containing compound in the presence of at least one blowing agent and a catalytically effective amount of a catalyst composition in accordance with the present invention can occur in the presence of at least one additive selected from at least one crosslinker, at least one cell stabilizer, at least one flame retardant, at least one chain extender, at least one epoxy resin, at least one acrylic resin, at least one filler, at least one pigment, or any combination thereof.

In accordance with the method of making polyurethane foam of the present invention, PUR foams can be produced having a tailored density. Fore example, PUR foams can be produced having from about 20 $Kg/m^3$ to about 250 $Kg/m^3$, from about 24 $Kg/m^3$ to about 60 $Kg/m^3$, or from about 35 $Kg/m^3$ to about 50 $Kg/m^3$.

Optionally, in yet another aspect, the method of the present invention can produce PUR foams with no or substantially no undesirable amine odor. In this aspect, the method for preparing PUR foam has thermally stability up to about 80° C., about 100° C., about 120° C., or about 150° C. In a still further aspect, the method of the present invention produces PUR foam that is substantially free of volatile amines and/or amine odors.

In accordance with one aspect of the method of the present invention, the components of the PUR foam formulation are contacted substantially contemporaneously. For example, at least one polyisocyanate, at least one active hydrogen-containing compound, at least one blowing agent and a catalytically effective amount of a catalyst composition comprising at least one compound having the formula (IV) are contacted together. Given the number of components involved in polyurethane formulations, there are many different orders of combining the components, and one of skill in the art would realize that varying the order of addition of the components falls within the scope of the present invention. As well, for each of the different orders of combining the aforementioned components of the foam formulation, the foam formulation of the present invention can further comprise additional urethane catalysts. In addition, the method of producing PUR foams can further comprise the presence of at least one additive selected from at least one crosslinker, at least one cell stabilizer, at least one flame retardant, at least one chain extender, at least one epoxy resin, at least one acrylic resin, at least one filler, at least one pigment, or any combination thereof. In one aspect of the present invention, all of the components, including optional components, are contacted substantially contemporaneously.

In another aspect of the present invention, a premix of ingredients other than the at least one polyisocyanate are contacted first, followed by the addition of the at least one polyisocyanate. For example, the at least one active hydrogen-containing compound, the at least one blowing agent, and a catalyst composition comprising at least one compound having the formula (IV) are contacted initially to form a premix. The premix is then contacted with the at least one polyisocyanate to produce PUR foams in accordance with the method of the present invention. In a further aspect of the present invention, the same method can be employed, wherein the premix further comprises additional urethane catalysts. Likewise, the premix can further comprise at least one additive selected from at least one crosslinker, at least one cell stabilizer, at least one flame retardant, at least one chain extender, at least one epoxy resin, at least one acrylic resin, at least one filler, at least one pigment, or any combination thereof.

Yet another aspect of the present invention provides a method for preparing a polyurethane foam comprising (a) forming a premix comprising:
  i) at least one polyol;
  ii) zero to about 80 percent polymer polyol based on the at least one polyol;
  iii) about 0.5 to about 20 parts by weight per hundred weight parts of the polyol (pphp) blowing agent;
  iv) zero to about 20 pphp water;
  v) about 0.05 to about 10 pphp crosslinker;
  vi) about 0.5 to about 10 pphp silicon surfactant;
  vii) zero to about 50 pphp flame retardant;
  viii) about 0.01 to about 20 pphp of a catalyst composition comprising at least one compound having the formula (IV); and
(b) contacting the premix with at least one polyisocyanate at an Isocyanate Index from about 40 to about 500.

EXAMPLES

An exemplary polyurethane flexible foam formulation containing a gelling and a blowing catalyst such as the catalyst compositions according to the present invention can comprise the components in parts by weight (pbw) shown in Table III. The general formulation in Table III would enable one of skill in the art to produce the polyurethane foams illustrated in the examples with densities in the range of about 35 Kg/m$^3$ to about 50 Kg/m$^3$. The catalyst quantity listed is the total catalyst amount, including both gelling and blowing catalysts, if applicable.

TABLE III

Formulations of Foams in Examples 1-6 (catalyst varied).

| COMPONENT | pbw |
| --- | --- |
| Polyol | 20-100 |
| Polymer Polyol | 0-80 |
| Silicone Surfactant | 1-2.5 |
| Blowing Agent | 2-4.5 |
| Crosslinker | 0.5-2 |
| Catalyst | 0.25-2 |
| Isocyanate Index | 70-115 |

The foams of the following examples were produced in a 32-oz (951 ml) paper cup by adding the catalyst (or catalysts) into approximately 192 grams of the premix formulation in Table III: polyol or polyols, surfactant, blowing agent, and crosslinker. This composition was mixed for about 10 seconds (s) at about 6,000 RPM using an overhead stirrer fitted with a 2-inch (5.1 cm) diameter stirring paddle. Sufficient isocyanate (either MDI or TDI) was then added to achieve the desired Isocyanate Index of about 100, and the formulation was mixed well for about 6 seconds (s) at about 6,000 RPM using the same stirrer. The 32-oz cup was dropped through a hole in the bottom of a 128-oz (3804 ml) paper cup on a stand. The hole was sized appropriately to catch the lip of the 32-oz cup. The total volume of the foam container was about 160 oz (4755 ml). Foams approximated this volume at the end of the PUR foam forming reaction.

In the following examples, various types and quantities of catalysts were used to produce PUR foams of the present invention. Although the amounts of each catalyst were not the same for each example, the respective catalyst quantities were chosen to provide similar properties. Specifically, In Examples 1 and 2, the catalyst quantities were chosen to provide similar foam start time, rise time, and free rise density. In Example 3, the catalyst quantities were chosen to match physical properties of the foams. In Examples 4-6, the catalyst quantities were chosen to provide similar foaming performance, or a similar foam height versus time profile, as measured by automated rate of rise equipment.

Example 1

Comparison of N,N,N'-trimethyl-bis-(aminoethyl) ether Catalyst with a Standard Catalyst in MDI Foams Gelling catalyst standard 1 was a mixture of mono and bis-dimethylaminopropyl urea, commercially available as the DABCO® NE1070 catalyst from Air Products and Chemicals, Inc. (APCI). Blowing catalyst standard 2 was N,N,N'-trimethyl-N'-hydroxyethyl-bis-aminoethyl ether. Inventive catalyst 3 was N,N,N'-trimethyl-bis-(aminoethyl) ether (TMAEE).

Table IV summarizes the MDI foaming results at an Isocyanate Index of about 100 using catalyst 3. Both gelling and blowing catalyst quantities are listed in pphp. Foams A and B were produced using a mixture of the blowing catalyst standard 2 and a gelling catalyst. Foam A used the gelling catalyst standard 1 at about 1.2 pphp, and Foam B used inventive catalyst 3, TMAEE, at about 1.0 pphp. Foam B had similar foaming properties to Foam A, as illustrated by the similar start time, rise time, and free rise density. Thus, catalyst 3 gave similar foaming performance to the commercial catalyst, gelling catalyst standard 1. However, the data also indicates that catalyst 3, TMAEE, is more active than the standard catalyst, since it provided similar foaming results at a lower addition level (about 1.0 pphp versus about 1.2 pphp).

This is further illustrated when comparing Foams C and D, which did not use blowing catalyst standard 2. Foams C and D had similar start times, rise times, and free rise densities. However, catalyst 3 was used at about 1.6 pphp, while gelling catalyst standard 1 was present at about 2.1 pphp. This confirms the higher activity of inventive catalyst 3, TMAEE, as compared to a commercial standard gelling catalyst.

TABLE IV

Comparison of catalyst 3 with a standard catalyst in MDI foams

| Catalyst | Foam A | Foam B | Foam C | Foam D |
|---|---|---|---|---|
| Gelling Catalyst Standard 1 (pphp) | 1.2 | — | 2.1 | — |
| Blowing Catalyst Standard 2 (pphp) | 0.2 | 0.2 | — | — |
| Catalyst 3 (pphp) | — | 1.0 | — | 1.6 |
| [a]Start Time (s) | 11 | 13 | 14 | 13 |
| [b]Rise Time (s) | 60 | 61 | 60 | 60 |
| [c]Free Rice Density (Kg/m$^3$) | 46 | 44 | 43 | 39 |

Notes:
[a]Start time is the time in seconds that it takes the foam formulation to increase its volume by 15%.
[b]Rise time is the time in seconds that it takes the foam to reach 98% of the final foam height.
[c]Free rise density, in units of Kg/m$^3$, is the density of the foam calculated by measuring the total weight of the foam and dividing the weight by the foam volume under free rise conditions.

Example 2

Comparison of N,N,N'-trimethyl-bis-(aminoethyl) ether Catalyst with a Standard Catalyst in TDI Foams Gelling catalyst standard 1 and blowing catalyst standard 2 were the same catalysts as described in Example 1. Similarly, inventive catalyst 3 was N,N,N'-trimethyl-bis-(aminoethyl) ether (TMAEE).

Table V summarizes the TDI foam results at an Isocyanate Index of about 100 using catalyst 3. Both gelling and blowing catalyst quantities are listed in pphp. Foams E and F were produced using a mixture of the blowing catalyst standard 2 and a gelling catalyst. Foam E used the gelling catalyst standard 1 at about 0.7 pphp, and Foam F used inventive catalyst 3, TMAEE, at about 0.5 pphp. Foam F had similar foaming properties to Foam E, as illustrated by the similar start time, rise time, and free rise density. Thus, catalyst 3 gave similar foaming performance to the commercial catalyst, gelling catalyst standard 1. However, the data also indicates that catalyst 3, TMAEE, is more active than the standard catalyst, since it provided similar foaming results at a lower addition level (about 0.5 pphp versus about 0.7 pphp).

This is further illustrated when comparing Foams G and H, which did not use blowing catalyst standard 2. Foams G and H had similar start times, rise times, and free rise densities. However, catalyst 3 was used at about 1.0 pphp, while gelling catalyst standard 1 was present at about 1.3 pphp. This confirms the higher activity of inventive catalyst 3, TMAEE, as compared to a commercial standard gelling catalyst.

TABLE V

Comparison of catalyst 3 with a standard catalyst in TDI foams

| Catalyst | Foam E | Foam F | Foam G | Foam H |
|---|---|---|---|---|
| Gelling Catalyst Standard 1 (pphp) | 0.7 | — | 1.3 | — |
| Blowing Catalyst Standard 2 (pphp) | 0.2 | 0.2 | — | — |
| Catalyst 3 (pphp) | — | 0.5 | — | 1.0 |
| [a]Start Time (s) | 11 | 12 | 11 | 11 |
| [b]Rise Time (s) | 81 | 78 | 85 | 78 |
| [c]Free Rise Density (Kg/m$^3$) | 37 | 36 | 43 | 36 |

Notes:
[a]Start time is the time in seconds that it takes the foam formulation to increase its volume by 15%.
[b]Rise time is the time in seconds that it takes the foam to reach 98% of the final foam height.
[c]Free rise density, in units of Kg/m$^3$, is the density of the foam calculated by measuring the total weight of the foam and dividing the weight by the foam volume under free rise conditions.

Example 3

Physical Property Comparison of Foams Produced using N,N,N'-trimethyl-bis-(aminoethyl) Ether Catalyst with Foams Produced using a Standard Catalyst Gelling catalyst standard 1 and blowing catalyst standard 2 were the same catalysts as described in Example 1. Similarly, inventive catalyst 3 was N,N,N'-trimethyl-bis-(aminoethyl) ether (TMAEE).

Table VI summarizes the physical properties of PUR foams made with inventive catalyst 3, and either MDI and TDI, and compared with current industry standards. As shown in Table VI and discussed above, catalyst 3 is more active than the industry standard. Table VI also illustrates that physical properties of the foam measured under humid aged conditions (e.g., HALL, HACS, etc.) produced with catalyst 3 are comparable to those obtained with industry standard catalyst systems.

TABLE VI

Physical property comparison of foams using catalyst 3 with foams using a standard catalyst.

| [d]Iso | [e]Molded Density Kg/m$^3$ | [f]Blowing Cat. 2 PPHP | [g]Gelling Cat. 1 PPHP | [h]Cat. 3 PPHP | [i]40% CLD Ambient KPa | [j]HALL % | [k]HACS % | [l]HA Tensile KPa | [m]HA Elongation % |
|---|---|---|---|---|---|---|---|---|---|
| MDI | 50 | 0.2 | 1.2 | | 12 | −15 | 27 | 140 | 95 |
| MDI | 50 | 0.2 | | 1.0 | 10 | −12 | 24 | 135 | 97 |

TABLE VI-continued

Physical property comparison of foams using catalyst 3 with foams using a standard catalyst.

| $^d$Iso | $^e$Molded Density Kg/m$^3$ | $^f$Blowing Cat. 2 PPHP | $^g$Gelling Cat. 1 PPHP | $^h$Cat. 3 PPHP | $^i$40% CLD Ambient KPa | $^j$HALL % | $^k$HACS % | $^l$HA Tensile KPa | $^m$HA Elongation % |
|---|---|---|---|---|---|---|---|---|---|
| TDI | 45 | 0.2 | 0.70 |  | 7.4 | −6.5 | 12 | 42 | 33 |
| TDI | 45 | 0.2 |  | 0.50 | 7.2 | −3.9 | 8 | 49 | 39 |

Notes:
$^d$Iso is the polyisocyanate used in the foam formulation, MDI or TDI.
$^e$Molded density is the density of foam produced in a mold.
$^f$Blowing Cat. 2 is the Blowing Catalyst Standard 2 of Examples 1 and 2.
$^g$Gelling Cat. 1 is the Gelling Catalyst Standard 1 of Examples 1 and 2.
$^h$Cat. 3 is the Inventive Catalyst 3 (TMAEE) of Examples 1 and 2.
$^i$40% CLD Ambient is the compression load deflection when the foam is compressed to 40% of its initial volume.
$^j$HALL is Humid Aged Load Loss, calculated according to the following equation:
$$\frac{40\% \text{ Hardness (final)} - 40\% \text{ Hardness (initial)}}{40\% \text{ Hardness (initial)}}$$
$^k$HACS is Humid Aged Compression Set, calculated according to the following equation:
$C_t = [(t_o - t_f)/t_o] * 100$, where
$C_t$ is equal to the compression set expressed as a percentage of the original thickness, $t_o$ is the original thickness of the test sample, and $t_f$ is the final thickness of the test sample 30 minutes (+10, −0 minutes) after removal from the test device.
$^l$HA Tensile is Humid Aged Tensile Strength, the tensile strength measured after aging the sample for 200 hours at 90° C. and 100% relative humidity.
$^m$HA Elongation is Humid Aged Elongation, the elongation measured after aging the sample for 200 hours at 90° C. and 100% relative humidity.

Example 4

Synthesis of N,N,N'-trimethyl-N'-(2-hydroxypropyl-butylether)-bis-(aminoethyl) ether, and Comparison of its Performance as a Catalyst with a Standard Catalyst in TDI Foams Approximately 25 g (about 0.17 mol) of N,N,N'-trimethyl-bis-(aminoethyl) ether (abbreviated TMAEE) was placed in a 250-ml temperature-controlled flask with a stir bar and a reflux condenser. TMAEE was heated to about 80° C. and controlled at that target temperature. While stirring the flask contents constantly, about 26.6 g (about 0.2 mol) of n-butyl glycidyl ether were added slowly from an addition funnel to the flask over a time period of about 1 hour. The n-butyl glycidyl ether is commercially available as EPODIL® 741 from Air Products and Chemicals, Inc. (APCI). A mild exotherm was noted during the addition of the n-butyl glycidyl ether.

Once the addition of the n-butyl glycidyl ether was complete, the reaction mixture was heated to a temperature of about 120° C. The flask contents were continuously stirred at this temperature for about 2 hours. Using a gas chromatograph (GC), it was confirmed that TMAEE had been completely consumed or reacted. The resulting reaction product, N,N, N'-trimethyl-N'-(2-hydroxypropyl-butylether)-bis-(aminoethyl) ether, constituted inventive catalyst 4. This compound is reflected in Table I as formula A-11. The general reaction scheme is illustrated below:

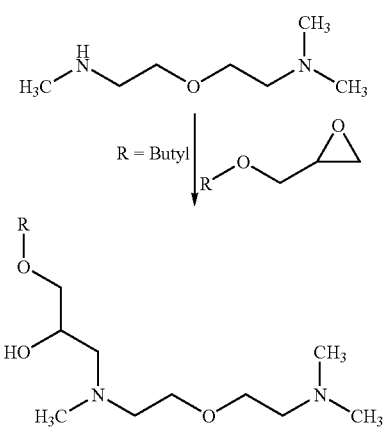

Table VII lists the catalyst levels used to produce Foam J and Foam K at an Isocyanate Index of about 100. Gelling catalyst standard 1 was the same catalyst as described in Example 1. Blowing catalyst standard 7 was a mixture of N,N,N'-trimethyl-N'-hydroxyethyl-bis-(aminoethyl) ether and mono and bis-dimethylaminopropyl ureas, commercially available as the DABCO® NE210 catalyst from Air Products and Chemicals, Inc. (APCI). Inventive catalyst 4 was N,N,N'-trimethyl-N'-(2-hydroxypropyl-butylether)-bis-(aminoethyl) ether.

FIG. 1 compares the foam height versus time for the standard or comparative Foam J with Foam K, which was produced using a catalyst mixture comprising about 0.33 pphp inventive catalyst 4 and about 0.70 pphp gelling catalyst standard 1. As illustrated in FIG. 1, Foam K had a foam height versus time (rate of rise) profile that was very similar to that of the standard Foam J. Thus, inventive catalyst 4 can provide similar foaming performance to commercially available polyurethane catalysts.

Example 5

Synthesis of N,N,N'-trimethyl-N'-(2-hydroxypropyl-2-ethylhexylether)-bis-(aminoethyl) Ether, and Comparison of its Performance as a Catalyst with a Standard Catalyst in TDI Foams Approximately 25 g (about 0.17 mol) of TMAEE was placed in a 250-ml temperature-controlled flask with a stir bar and a reflux condenser. TMAEE was heated to about 80° C. and controlled at that target temperature. While stirring the flask contents constantly, about 35 g (about 0.19 mol) of 2-ethylhexyl glycidyl ether were added slowly from an addition funnel to the flask over a time period of about 1 hour. The 2-ethylhexyl glycidyl ether is commercially available as EPODIL® 746 from Air Products and Chemicals, Inc. (APCI). A mild exotherm was noted during the addition of the 2-ethylhexyl glycidyl ether.

Once the addition of the 2-ethylhexyl glycidyl ether was complete, the reaction mixture was heated to a temperature of about 120° C. The flask contents were continuously stirred at this temperature for about 2 hours. Using a gas chromatograph (GC), it was confirmed that TMAEE had been completely consumed or reacted. The resulting reaction product, N,N, N'-trimethyl-N'-(2-hydroxypropyl-2-ethylhexylether)-bis-(aminoethyl) ether, constituted inventive catalyst 5. This compound is reflected in Table I as formula A-47. The general reaction scheme is illustrated below:

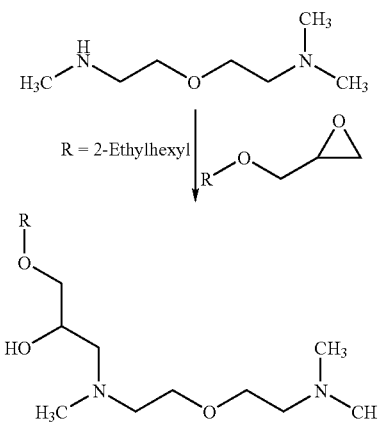

Table VII lists the catalyst levels used to produce Foam J and Foam L at an Isocyanate Index of about 100. Gelling catalyst standard 1 was the same catalyst as described in Example 1. Blowing catalyst standard 7 was the same catalyst as described in Example 4. Inventive catalyst 5 was N,N,N'-trimethyl-N'-(2-hydroxypropyl-2-ethylhexylether)-bis-(aminoethyl) ether.

FIG. 2 compares the foam height versus time for the standard or comparative Foam J with Foam L, which was produced using a catalyst mixture comprising about 0.43 pphp inventive catalyst 5 and about 0.70 pphp gelling catalyst standard 1. As illustrated in FIG. 2, Foam L had a foam height versus time (rate of rise) profile that was almost identical to that of the standard Foam J. Thus, inventive catalyst 5 can provide similar foaming performance to commercially available polyurethane catalysts.

Example 6

Synthesis of N,N,N'-trimethyl-N'-(2-hydroxypropyl-dodecylether)-bis-(aminoethyl) ether and N,N, N'-trimethyl-N'-(2-hydroxypropyl-tetradecylether)-bis-(aminoethyl) ether, and Comparison of their Performance as a Mixed Catalyst with a Standard Catalyst in TDI Foams Approximately 25 g (about 0.17 mol) of TMAEE was placed in a 250-ml temperature-controlled flask with a stir bar and a reflux condenser. TMAEE was heated to about 80° C. and controlled at that target temperature. While stirring the flask contents constantly, about 50.8 g of a mixture of approximately 75% dodecyl glycidyl ether and approximately 25% tetradecyl glycidyl ether ($C_{12}$ and $C_{14}$ glycidyl ethers) were added slowly from an addition funnel to the flask over a time period of about 1 hour. The approximate 75% $C_{12}$/25% $C_{14}$ glycidyl ether blend is commercially available as EPODIL® 748 from Air Products and Chemicals, Inc. (APCI). A mild exotherm was noted during the addition of the $C_{12}/C_{14}$ glycidyl ether blend.

Once the addition of the $C_{12}/C_{14}$ glycidyl ether blend was complete, the reaction mixture was heated to a temperature of about 120° C. The flask contents were continuously stirred at this temperature for about 2 hours. Using a gas chromatograph (GC), it was confirmed that TMAEE had been completely consumed or reacted. The resulting reaction product mixture, N,N,N'-trimethyl-N'-(2-hydroxypropyl-dodecylether)-bis-(aminoethyl) ether and N,N,N'-trimethyl-N'-(2-hydroxypropyl-tetradecylether)-bis-(aminoethyl) ether, constituted inventive catalyst 6. These compounds are reflected in Table I as formulas A-65 and A-71. The general reaction scheme is illustrated below:

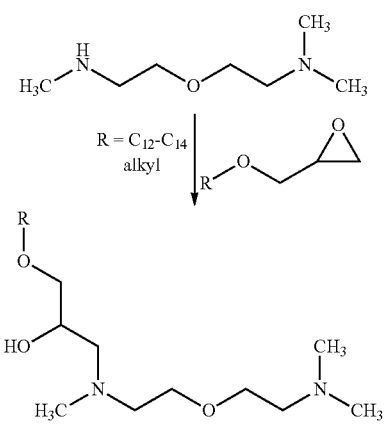

Table VII lists the catalyst levels used to produce Foam J and Foam M at an Isocyanate Index of about 100. Gelling catalyst standard 1 was the same catalyst as described in Example 1. Blowing catalyst standard 7 was the same catalyst as described in Example 4. Inventive catalyst 6 was a mixture of N,N,N'-trimethyl-N'-(2-hydroxypropyl-dodecylether)-bis-(aminoethyl) ether and N,N, N'-trimethyl-N'-(2-hydroxypropyl-tetradecylether)-bis-(aminoethyl) ether.

FIG. 3 compares the foam height versus time for the standard or comparative Foam J with Foam M, which was produced using a catalyst mixture comprising about 0.65 pphp inventive catalyst 6 and about 0.70 pphp gelling catalyst standard 1. As illustrated in FIG. 3, Foam M had a foam height versus time (rate of rise) profile that was very similar to that of the standard Foam J. Thus, inventive catalyst 6 can provide similar foaming performance to commercially available polyurethane catalysts.

TABLE VII

Catalysts used in the Foam Formulations of Examples 4-6

| Catalyst | Foam J | Foam K | Foam L | Foam M |
|---|---|---|---|---|
| Gelling Catalyst Standard 1 (pphp) | 0.19 | 0.70 | 0.70 | 0.70 |
| Blowing Catalyst Standard 7 (pphp) | 0.68 | — | — | — |
| Catalyst 4 (pphp) | — | 0.33 | — | — |
| Catalyst 5 (pphp) | — | — | 0.43 | — |
| Catalyst 6 (pphp) | — | — | — | 0.65 |

Constructive Example 7

Constructive Synthesis of N,N,N'-trimethyl-N'-(2-hydroxypropyl-butylester)-bis-(aminoethyl) ether, and Constructive Comparison of its Performance as a Catalyst with a Standard Catalyst in MDI or TDI Foams First, place approximately 25 g (about 0.17 mol) of TMAEE in a 250-ml temperature-controlled flask with a stir bar and a reflux condenser. Heat TMAEE to about 80° C. and control at that target temperature. While stirring the flask contents constantly, add about 0.17 mol of n-butyl glycidyl ester slowly from an addition funnel to the flask over a time period of about 1 hour. The molar ratio of TMAEE to the glycidyl ester should be close to 1:1. A mild exotherm should be observed during the addition of the n-butyl glycidyl ester.

Once the addition of the n-butyl glycidyl ester is complete, heat the reaction mixture to a temperature of about 120° C. Stir the flask contents substantially continuously at this temperature for about 2 hours. A gas chromatograph (GC) can be employed to confirm that the TMAEE is completely consumed or reacted. The resulting reaction product, N,N,N'-trimethyl-N'-(2-hydroxypropyl-butylester)-bis-(aminoethyl) ether, will constitute inventive catalyst 7. This compound is reflected in Table II as formula B-05.

Foams can be produced at an Isocyanate Index of about 100 using catalyst levels similar to those illustrated in Table VII and using the foam formulation illustrated in Table III. Gelling catalyst standard 1 can be the same catalyst as described in Example 1 and used at a level of about 0.7 pphp. Blowing catalyst standard 7 can be the same catalyst as described in Example 4. Inventive catalyst 7 will be N,N,N'-trimethyl-N'-(2-hydroxypropyl-butylester)-bis-(aminoethyl) ether and can be used a level of about 0.3 to about 0.5 pphp, chosen to match the foaming performance of the standard formulation (e.g., Foam J in Table VII). One or ordinary skill in the art would be able to produce polyurethane foams with densities in the range of about 35 Kg/m$^3$ to about 50 Kg/m$^3$.

The foams can be produced in a 32-oz (951 ml) paper cup by adding the catalyst (or catalysts) into approximately 192 grams of the premix formulation in Table III: polyol or polyols, surfactant, blowing agent, and crosslinker. This composition is then mixed for about 10 seconds (s) at about 6,000 RPM using an overhead stirrer fitted with a 2-inch (5.1 cm) diameter stirring paddle. Sufficient isocyanate (either MDI or TDI) is added to achieve the desired Isocyanate Index of about 100, and the formulation is mixed well for about 6 seconds (s) at about 6,000 RPM using the same stirrer. The 32-oz cup then is dropped through a hole in the bottom of a 128-oz (3804 ml) paper cup on a stand. The hole should be sized appropriately to catch the lip of the 32-oz cup. The total volume of the foam container is about 160 oz (4755 ml). Foams can approximate this volume at the end of the PUR foam forming reaction. Foaming performance of inventive catalyst 7 can be evaluated by comparing the foam height versus time profile versus that of standard Foam J, as is shown in FIGS. 1-3 pertaining to Examples 4-6. Foam height profiles can be measured by automated rate of rise equipment.

The invention claimed is:

1. A method of making a polyurethane comprising contacting at least one polyisocyanate with at least one active hydrogen-containing compound in the presence of a catalytically effective amount of a catalyst composition under conditions sufficient to produce the polyurethane, the catalyst composition comprising at least one compound having the formula:

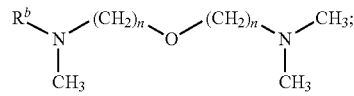

wherein:
n in each occurrence is selected independently from 1, 2, or 3;
$R^b$ is a)

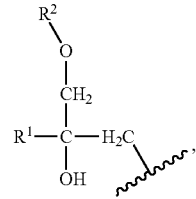

b)

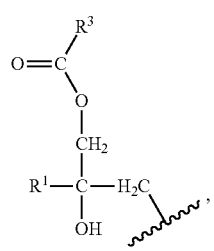

$R^1$ is selected independently from a hydrogen atom or a substituted or unsubstituted $C_1$-$C_5$ alkyl or alkenyl group; and
$R^2$ and $R^3$ are selected independently from a substituted or unsubstituted $C_1$-$C_{24}$ alkyl, alkenyl, aryl, or aralkyl group.

2. The method of claim 1, wherein the at least one compound has the formula:

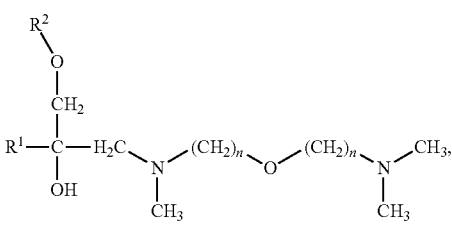

wherein:
R¹ is a hydrogen atom or a methyl group; and
R² is a methyl, an ethyl, a propyl, a butyl, a pentyl, a hexyl, a heptyl, an octyl, a 2-ethylhexyl, a nonyl, a decyl, a dodecyl, a tetradecyl, a hexadecyl, an octadecyl, a phenyl, a tolyl, or a benzyl group.

3. The method of claim 1, wherein the at least one compound is:
N,N,N'-trimethyl-N'-(2-hydroxypropyl-butylether)-bis-(aminoethyl) ether;
N,N,N'-trimethyl-N'-(2-hydroxypropyl-hexylether)-bis-(aminoethyl) ether;
N,N,N'-trimethyl-N'-(2-hydroxypropyl-2-ethylhexylether)-bis-(aminoethyl) ether;
N,N,N'-trimethyl-N'-(2-hydroxypropyl-dodecylether)-bis-(aminoethyl) ether;
N,N,N'-trimethyl-N'-(2-hydroxypropyl-tetradecylether)-bis-(aminoethyl) ether;
N,N,N'-trimethyl-N'-(2-hydroxypropyl-hexadecylether)-bis-(aminoethyl) ether; N,N,N'-trimethyl-N'-(2-hydroxypropyl-benzylether)-bis-(aminoethyl) ether;
or any combination thereof.

4. The method of claim 1, wherein the at least one compound has the formula:

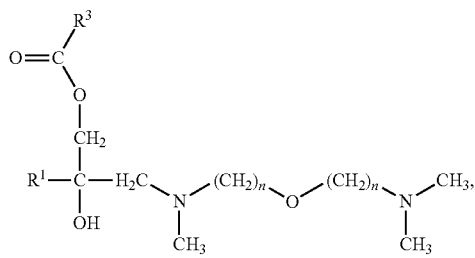

wherein:
R¹ is a hydrogen atom or a methyl group; and
R³ is a methyl, an ethyl, a propyl, a butyl, a pentyl, a hexyl, a heptyl, an octyl, a 2-ethylhexyl, a nonyl, a decyl, a dodecyl, a tetradecyl, a hexadecyl, an octadecyl, a phenyl, a tolyl, or a benzyl group.

5. The method of claim 1, wherein the at least one compound is:
N,N,N'-trimethyl-N'-(2-hydroxypropyl-butylester)-bis-(aminoethyl) ether;
N,N,N'-trimethyl-N'-(2-hydroxypropyl-2-ethylhexylester)-bis-(aminoethyl) ether;
N,N,N'-trimethyl-N'-(2-hydroxypropyl-neodecylester)-bis-(aminoethyl) ether;
N,N,N'-trimethyl-N'-(2-hydroxypropyl-dodecylester)-bis-(aminoethyl) ether;
N,N,N'-trimethyl-N'-(2-hydroxypropyl-tetradecylester)-bis-(aminoethyl) ether;
N,N,N'-trimethyl-N'-(2-hydroxypropyl-octadecylester)-bis-(aminoethyl) ether;
N,N,N'-trimethyl-N'-(2-hydroxypropyl-benzylester)-bis-(aminoethyl) ether;
or any combination thereof.

6. The method of claim 1, wherein the at least one polyisocyanate is diphenyl methane diisocyanate, toluene diisocyanate, or a combination thereof.

7. The method of claim 1, wherein the at least one active hydrogen-containing compound is at least one polyether polyol, at least one polyester polyol, at least one polymer polyol, or any combination thereof.

8. The method of claim 1, wherein the contacting of the at least one polyisocyanate and the at least one active hydrogen-containing compound occurs in the presence of at least one blowing agent under conditions sufficient to produce a polyurethane foam, wherein the at least one blowing agent is water, methylene chloride, acetone, a chlorofluorocarbon, a hydrofluorocarbon, a hydrochlorofluorocarbon, a hydrocarbon, or any combination thereof.

9. The method of claim 1, wherein the catalyst composition further comprises at least one gelling urethane catalyst, at least one blowing urethane catalyst, or a combination thereof, wherein the at least one gelling urethane catalyst or the at least one blowing urethane catalyst is not the at least one compound having the formula of claim 1.

* * * * *